US008465875B2

(12) United States Patent
Hosoe et al.

(10) Patent No.: US 8,465,875 B2
(45) Date of Patent: Jun. 18, 2013

(54) THREE-DIMENSIONAL NETWORK ALUMINUM POROUS BODY FOR CURRENT COLLECTOR, ELECTRODE USING THE ALUMINUM POROUS BODY, AND BATTERY, CAPACITOR AND LITHIUM-ION CAPACITOR EACH USING THE ELECTRODE

(75) Inventors: Akihisa Hosoe, Osaka (JP); Kazuki Okuno, Osaka (JP); Hajime Ota, Osaka (JP); Koutarou Kimura, Osaka (JP); Kengo Goto, Osaka (JP); Hideaki Sakaida, Osaka (JP); Junichi Nishimura, Imizu (JP)

(73) Assignees: Sumitomo Electric Industries, Ltd., Osaka-shi, Osaka (JP); Sumitomo Electric Toyama Co., Ltd., Imizu-shi, Toyama (JP)

( * ) Notice: Subject to any disclaimer, the term of this patent is extended or adjusted under 35 U.S.C. 154(b) by 0 days.

(21) Appl. No.: 13/483,609

(22) Filed: May 30, 2012

(65) Prior Publication Data
US 2012/0288758 A1    Nov. 15, 2012

Related U.S. Application Data

(63) Continuation of application No. PCT/JP2012/053397, filed on Feb. 14, 2012.

(30) Foreign Application Priority Data

Feb. 18, 2011  (JP) .................................. 2011-032854
May 18, 2011  (JP) .................................. 2011-111039
Dec. 21, 2011  (JP) .................................. 2011-279172

(51) Int. Cl.
*H01M 4/80*    (2006.01)

(52) U.S. Cl.
USPC ........... 429/235; 429/233; 429/238; 429/242; 429/245

(58) Field of Classification Search
USPC .................. 429/233.238, 245, 242, 233, 235, 429/238
See application file for complete search history.

(56) References Cited

U.S. PATENT DOCUMENTS 5,434,024 A * 7/1995 Ikeda et al. .................... 429/234
6,682,848 B1   1/2004 Yano et al.
(Continued)

FOREIGN PATENT DOCUMENTS

JP    56086459 A    7/1981
JP    08-170126 A   7/1996
(Continued)

OTHER PUBLICATIONS

U.S. Appl. No. 13/539,583, Hosoe et al.
(Continued)

*Primary Examiner* — Zachary Best
(74) *Attorney, Agent, or Firm* — Drinker Biddle & Reath LLP

(57) ABSTRACT

It is an object of the present invention to provide a sheet-shaped three-dimensional network aluminum porous body for a current collector which is suitably used for electrodes for nonaqueous electrolyte batteries and electrodes for capacitors, an electrode and a capacitor each using the same. In such a three-dimensional network aluminum porous body for a current collector, the aluminum porous body has been made to have a compressive strength in a thickness direction of 0.2 MPa or more in order to efficiently fill an active material into the sheet-shaped three-dimensional network aluminum porous body.

12 Claims, 13 Drawing Sheets

U.S. PATENT DOCUMENTS

| | | | |
|---|---|---|---|
| 2005/0238956 A1* | 10/2005 | Lee .............................. | 429/211 |
| 2010/0027195 A1 | 2/2010 | Taguchi et al. | |

FOREIGN PATENT DOCUMENTS

| | | | |
|---|---|---|---|
| JP | 2000-208144 A | 7/2000 | |
| JP | 2001-102084 A | 4/2001 | |
| JP | 3202072 | 6/2001 | |
| JP | 3413662 | 4/2003 | |
| JP | 2007-141897 A | 6/2007 | |
| JP | 2010-108971 A | 5/2010 | |
| JP | 2010232171 A | 10/2010 | |
| JP | 2010-272425 A | 12/2010 | |
| JP | 2010-283042 A | 12/2010 | |

OTHER PUBLICATIONS

U.S. Appl. No. 13/557,430, Hosoe et al.
U.S. Appl. No. 13/539,557, Hosoe et al.
U.S. Appl. No. 13/539,573, Hosoe et al.
U.S. Appl. No. 13/483,505, Hosoe et al.
U.S. Appl. No. 13/569,288, Hosoe et al.
U.S. Appl. No. 13/483,626, Hosoe et al.
U.S. Appl. No. 13/569,300, Hosoe et al.
U.S. Appl. No. 13/494,353, Hosoe et al.
U.S. Appl. No. 13/470,817, Hosoe et al.
U.S. Appl. No. 13/569,319, Hosoe et al.
U.S. Appl. No. 13/569,322, Hosoe et al.
U.S. Appl. No. 13/569,325, Hosoe et al.
U.S. Appl. No. 13/539,587, Hosoe et al.
U.S. Appl. No. 13/557,442, Hosoe et al.
U.S. Office Action dated Nov. 19, 2012 that issued in U.S. Appl. No. 13/557,430 including Double Patenting Rejections on pp. 4-5.
U.S. Office Action dated Feb. 26, 2013 that issued in U.S. Appl. No. 13/557,430 including Double Patenting Rejections at pp. 5-7.

* cited by examiner

Sectional view taken on line A-A

THREE-DIMENSIONAL NETWORK ALUMINUM POROUS BODY FOR CURRENT COLLECTOR, ELECTRODE USING THE ALUMINUM POROUS BODY, AND BATTERY, CAPACITOR AND LITHIUM-ION CAPACITOR EACH USING THE ELECTRODE

TECHNICAL FIELD

The present invention relates to a three-dimensional network aluminum porous body for a current collector, which is used for a nonaqueous electrolyte battery (lithium battery, etc.), a capacitor, a lithium-ion capacitor and the like using a nonaqueous electrolytic solution.

BACKGROUND ART

Metal porous bodies having a three-dimensional network structure have been used in a wide range of applications, such as various filters, catalyst supports and battery electrodes. For example, Celmet (manufactured by Sumitomo Electric Industries, Ltd., registered trademark) composed of three-dimensional network nickel porous body (hereinafter, referred to as a "nickel porous body") has been used as an electrode material for batteries, such as nickel-hydrogen batteries and nickel-cadmium batteries. Celmet is a metal porous body having continuous pores and characteristically has a higher porosity (90% or more) than other porous bodies such as metallic nonwoven fabrics. Celmet can be obtained by forming a nickel layer on the surface of the skeleton of a porous resin molded body having continuous pores such as urethane foam, then decomposing the resin molded body by heat treatment, and reducing the nickel. The nickel layer is formed by performing a conductive treatment of applying a carbon powder or the like to the surface of the skeleton of the resin molded body and then depositing nickel by electroplating.

On the other hand, as with nickel, aluminum has excellent characteristics such as a conductive property, corrosion resistance and lightweight, and for applications in batteries, for example, an aluminum foil in which an active material, such as lithium cobalt oxide, is applied onto the surface thereof has been used as a positive electrode of a lithium battery. In order to increase the capacity of a positive electrode, it is considered that a three-dimensional network aluminum porous body (hereinafter, referred to as an "aluminum porous body") in which the surface area of aluminum is increased is used and the inside of the aluminum is filled with an active material. The reason for this is that this allows the active material to be utilized even in an electrode having a large thickness and improves the active material availability ratio per unit area.

As a method for manufacturing an aluminum porous body, Patent Literature 1 describes a method of subjecting a three-dimensional network plastic substrate having an inner continuous space to an aluminum vapor deposition process by an arc ion plating method to form a metallic aluminum layer having a thickness of 2 to 20 μm.

It is said that in accordance with this method, an aluminum porous body having a thickness of 2 to 20 μm is obtained, but since this method is based on a vapor-phase process, it is difficult to manufacture a large-area porous body, and it is difficult to form a layer which is internally uniform depend on the thickness or porosity of the substrate. Further, this method has problems that a formation rate of the aluminum layer is low and production cost is high since equipment for manufacturing is expensive. Moreover, when a thick film is formed, there is a possibility that cracks may be produced in the film or aluminum may exfoliate.

Patent Literature 2 describes a method of obtaining an aluminum porous body, including forming a film made of a metal (such as copper) on the skeleton of a resin foam molded body having a three-dimensional network structure, the metal having an ability to form an eutectic alloy at a temperature equal or below the melting point of aluminum, then applying an aluminum paste to the film, and performing a heat treatment in a non-oxidizing atmosphere at a temperature of 550° C. or higher and 750° C. or lower to remove an organic constituent (resin foam) and sinter an aluminum powder.

However, in accordance with this method, a layer which forms a eutectic alloy of the above-mentioned metal and aluminum is produced and an aluminum layer of high purity cannot be formed.

As other methods, it is considered that a resin foam molded body having a three-dimensional network structure is subjected to aluminum plating. An electroplating process of aluminum itself is known, but since aluminum has high chemical affinity to oxygen and a lower electric potential than hydrogen, the electroplating in a plating bath containing an aqueous solution system is difficult. Thus, conventionally, aluminum electroplating has been studied in a plating bath containing a nonaqueous solution system. For example, as a technique for plating a metal surface with aluminum for the purpose of antioxidation of the metal surface, Patent Literature 3 discloses an aluminum electroplating method wherein a low melting composition, which is a blend melt of an onium halide and an aluminum halide, is used as a plating bath, and aluminum is deposited on a cathode while the water content of the plating bath is maintained at 2 mass % or less.

However, in the aluminum electroplating, plating of only a metal surface is possible, and there is no known method of electroplating on the surface of a resin molded body, in particular electroplating on the surface of a resin molded body having a three-dimensional network structure.

The present inventors have made earnest investigations concerning a method of electroplating the surface of a resin molded body made of polyurethane having a three-dimensional network structure with aluminum, and have found that it is possible to electroplate the surface of a resin molded body made of polyurethane by plating the resin molded body, in which at least the surface is made electrically conductive, with aluminum in a molten salt bath. These findings have led to completion of a method for manufacturing an aluminum porous body. In accordance with this manufacturing method, an aluminum structure having a resin molded body made of polyurethane as the core of its skeleton can be obtained. For some applications such as various filters and catalyst supports, the aluminum structure may be used as a resin-metal composite as it is, but when the aluminum structure is used as a metal structure without a resin because of constraints resulting from the usage environment, an aluminum porous body needs to be formed by removing the resin.

Removal of the resin can be performed by any method, including decomposition (dissolution) with an organic solvent, a molten salt or supercritical water, decomposition by heating or the like.

Here, a method of decomposition by heating at high temperature or the like is convenient, but it involves oxidation of aluminum. Since aluminum is difficult to reduce after being oxidized once as distinct from nickel, if being used in, for example, an electrode material of a battery or the like, the electrode loses a conductive property due to oxidation, and therefore aluminum cannot be used as the electrode material.

Thus, the present inventors have completed a method for manufacturing an aluminum porous body, in which an aluminum structure obtained by forming an aluminum layer on the surface of a resin molded body is heated to a temperature equal or below the melting point of aluminum in a state being dipped in a molten salt while applying a negative potential to the aluminum layer to remove the resin molded body through thermal decomposition to obtain an aluminum porous body, as a method of removing a resin without causing the oxidation of aluminum.

Incidentally, in order to use the aluminum porous body thus obtained as an electrode, it is necessary to attach a lead wire to the aluminum porous body to form a current collector, fill the aluminum porous body serving as the current collector with an active material, and subject the resulting aluminum porous body to treatments such as compressing and cutting by a process shown in FIG. 1, but a technology for practical use for industrially manufacturing electrodes for nonaqueous electrolyte batteries, and capacitors, lithium-ion capacitors and the like each using a nonaqueous electrolytic solution from an aluminum porous body has not yet been known.

CITATION LIST

Patent Literatures

Patent Literature 1: Japanese Patent No. 3413662
Patent Literature 2: Japanese Unexamined Patent Publication No. 8-170126
Patent Literature 3: Japanese Patent No. 3202072
Patent Literature 4: Japanese Unexamined Patent Publication No. 56-86459

SUMMARY OF INVENTION

Technical Problem

The present invention relates to a three-dimensional network aluminum porous body which can be used as a current collector of an electrode for a nonaqueous electrolyte battery, a capacitor (hereinafter, referred to as simply a "capacitor") using a nonaqueous electrolytic solution and a lithium-ion capacitor (hereinafter, referred to as simply a lithium-ion capacitor) using a nonaqueous electrolytic solution and the like.

Solution to Problem

The constitution of the present invention is as follows.

(1) A three-dimensional network aluminum porous body for a current collector, comprising a sheet-shaped three-dimensional network aluminum porous body having a compressive strength in a thickness direction of 0.2 MPa or more.

(2) The three-dimensional network aluminum porous body for a current collector according to (1), wherein a skeleton forming the aluminum porous body has a surface roughness (Ra) of 0.5 μm or more and 10 μm or less.

(3) The three-dimensional network aluminum porous body for a current collector according to (1) or (2), wherein the aluminum porous body has an average cell diameter of 50 μm or more and 800 μm or less.

(4) The three-dimensional network aluminum porous body for a current collector according to (3), wherein the average cell diameter is 200 μm or more and 500 μm or less.

(5) An electrode, comprising filling the three-dimensional network aluminum porous body for a current collector according to any one of (1) to (4) with an active material.

(6) A nonaqueous electrolyte battery, comprising using the electrode according to (5).

(7) A capacitor using a nonaqueous electrolytic solution, comprising using the electrode according to (5).

(8) A lithium-ion capacitor using a nonaqueous electrolytic solution, comprising using the electrode according to (5).

Advantageous Effects of Invention

The electrode manufactured by using the aluminum porous body for a current collector of the present invention increases the availability ratio of an active material per a unit volume and can realize a higher capacity, and can decrease the number of layers of a laminate to reduce processing cost in processing the aluminum porous body into an electrode.

DESCRIPTION OF EMBODIMENTS

First, a method for manufacturing the aluminum porous body of the present invention will be described. Hereinafter, the manufacturing method will be described with reference to the drawings if necessary, taking an example in which an aluminum plating method is applied as a method of forming an aluminum film on the surface of a resin molded body made of polyurethane for a representative example. Throughout the reference figures hereinafter, the parts assigned the same number are the same parts or the corresponding parts. The present invention is not limited thereto but is defined by the claims, and all modifications which fall within the scope of the claims and the equivalents thereof are intended to be embraced by the claims.

(Step of Manufacturing Aluminum Structure)

Figure 5:
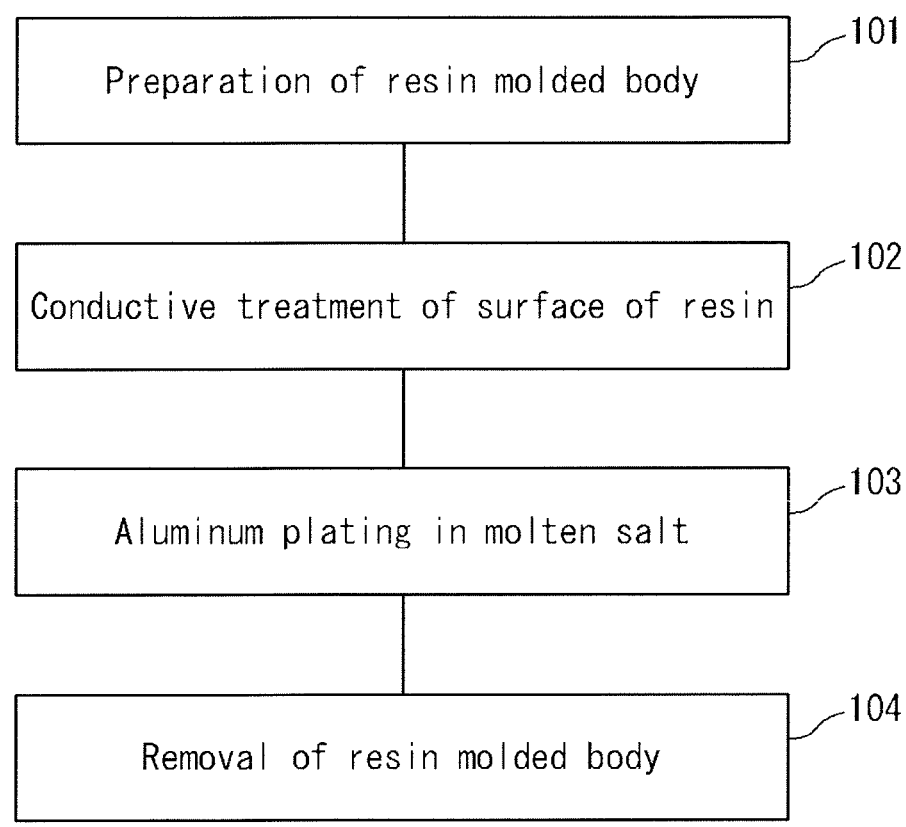
FIG. 5 is a flow chart showing a step of manufacturing an aluminum porous body.
Figure 6A:
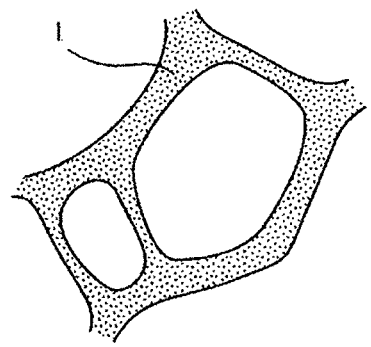
FIGS. 6A, 6B, 6C and 6D are schematic sectional views illustrating a step of manufacturing an aluminum porous body.
Figure 6B:
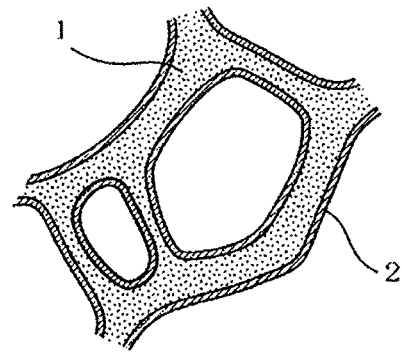

FIG. 5 is a flow chart showing a step of manufacturing an aluminum structure. FIGS. 6A to 6D show schematic views of the formation of an aluminum plating film using a resin molded body as a core material corresponding to the flow chart. The overall flow of the manufacturing step will be described with reference to both figures. First, preparation 101 of a resin molded body serving as a base material is performed. FIG. 6A is an enlarged schematic view of the surface of a resin molded body having continuous pores as an example of a resin molded body serving as a base material. Pores are formed in the skeleton of a resin molded body 1. Next, a conductive treatment 102 of the surface of the resin molded body is performed. As illustrated in FIG. 6B, through this step, a thin conductive layer 2 made of an electric conductor is formed on the surface of the resin molded body 1.

Figure 6C:
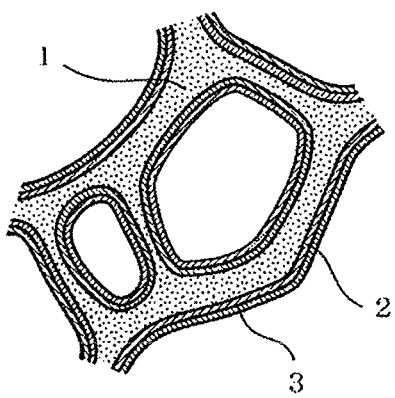

Subsequently, aluminum plating 103 in a molten salt is performed to form an aluminum plated layer 3 on the surface of the conductive layer of the resin molded body (FIG. 6C). Thereby, an aluminum structure is obtained in which the aluminum plated layer 3 is formed on the surface of the resin molded body serving as a base material. Removal 104 of the resin molded body serving as the base material is performed.

Figure 6D:
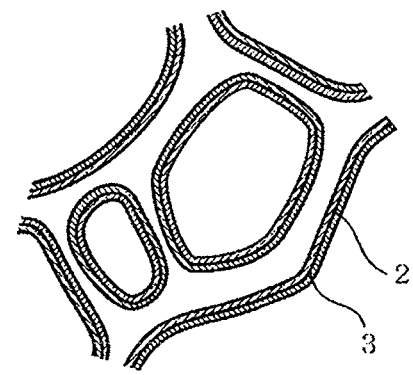

The resin molded body 1 can be removed by decomposition or the like to obtain an aluminum structure (porous body) containing only a remaining metal layer (FIG. 6D). Hereinafter, each of these steps will be described in turn.

(Preparation of Resin Molded Body)

A resin molded body having a three-dimensional network structure and continuous pores is prepared. A material of the resin molded body may be any resin. As the material, a resin foam molded body made of polyurethane, melamine resin, polypropylene or polyethylene can be exemplified. Though the resin foam molded body has been exemplified, a resin molded body having any shape may be selected as long as the resin molded body has continuously-formed pores (continuous pores). For example, a resin molded body having a shape like a nonwoven fabric formed by tangling fibrous resin can be used in place of the resin foam molded body. The resin foam molded body preferably has a porosity of 80% to 98% and a pore diameter of 50 μm to 500 μm. Urethane foams and melamine foam resins have a high porosity, continuity of pores, and excellent thermal decomposition properties and therefore they can be preferably used as the resin foam molded body. Urethane foams are preferred in points of uniformity of pores, easiness of availability and the like, and preferred in that urethane foams with a small pore diameter can be available.

Figure 7:
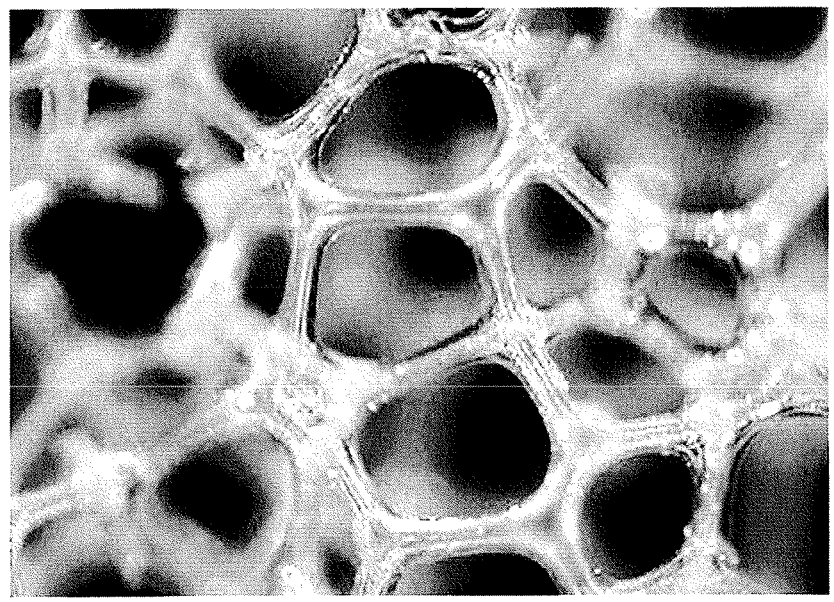
FIG. 7 is an enlarged photograph of the surface of the structure of a resin molded body made of polyurethane.

Resin molded bodies often contain residue materials such as a foaming agent and an unreacted monomer in the manufacture of the foam, and are therefore preferably subjected to a washing treatment for the sake of the subsequent steps. As an example of the resin molded body, a urethane foam subjected to a washing treatment as a preliminary treatment is shown in FIG. 7. In the resin molded body, a three-dimensional network is configured as a skeleton, and therefore continuous pores are configured as a whole. The skeleton of the urethane foam has an almost triangular shape in a cross-section perpendicular to its extending direction. Herein, the porosity is defined by the following equation:

$$\text{Porosity} = (1 - (\text{mass of porous material}[g]/(\text{volume of porous material}[cm^3] \times \text{material density}))) \times 100[\%]$$

Further, the pore diameter is determined by magnifying the surface of the resin molded body in a photomicrograph or the like, counting the number of pores per inch (25.4 mm) as the number of cells, and calculating an average pore diameter by the following equation: average pore diameter=25.4 mm/the number of cells.

(Conductive Treatment of Surface of Resin Molded Body)

In order to perform electroplating, the surface of the resin foam is previously subjected to a conductive treatment. A method of the conductive treatment is not particularly limited as long as it is a treatment by which a layer having a conductive property can be disposed on the surface of the resin molded body, and any method, including electroless plating of a conductive metal such as nickel, vapor deposition and sputtering of aluminum or the like, and application of a conductive coating material containing conductive particles such as carbon, may be selected.

As an example of the conductive treatment, a method of making the surface of the resin foam electrically conductive by sputtering of aluminum, and a method of making the surface of the resin foam electrically conductive by using carbon as conductive particles will be described below.

—Sputtering of Aluminum—

A sputtering treatment using aluminum is not limited as long as aluminum is used as a target, and it may be performed according to an ordinary method. A sputtering film of aluminum is formed by, for example, holding a resin molded body with a substrate holder, and then applying a direct voltage between the holder and a target (aluminum) while introducing an inert gas into the sputtering apparatus to make an ionized inert-gas impinge onto the aluminum target and deposit the sputtered aluminum particles on the surface of the resin molded body. The sputtering treatment is preferably performed below a temperature at which the resin molded body is not melted, and specifically, the sputtering treatment may be performed at a temperature of about 100 to 200° C., and preferably at a temperature of about 120 to 180° C.

—Carbon Application—

A carbon coating material is prepared as a conductive coating material. A suspension liquid serving as the conductive coating material preferably contains carbon particles, a binder, a dispersing agent, and a dispersion medium. Uniform application of conductive particles requires maintenance of uniform suspension of the suspension liquid. Thus, the suspension liquid is preferably maintained at a temperature of 20° C. to 40° C. The reason for this is that a temperature of the suspension liquid below 20° C. results in a failure in uniform suspension, and only the binder is concentrated to form a layer on the surface of the skeleton constituting the network structure of the resin molded body. In this case, a layer of applied carbon particles tends to peel off, and metal plating firmly adhering to the substrate is hardly formed. On the other hand, when a temperature of the suspension liquid is higher than 40° C., since the amount of the dispersing agent to evaporate is large, with the passage of time of application treatment, the suspension liquid is concentrated and the amount of carbon to be applied tends to vary. The carbon particle has a particle diameter of 0.01 to 5 μm, and preferably 0.01 to 0.5 μm. A large particle diameter may result in the clogging of holes of the resin molded body or interfere with smooth plating, and too small particle diameter makes it difficult to ensure a sufficient conductive property.

Figure 8:
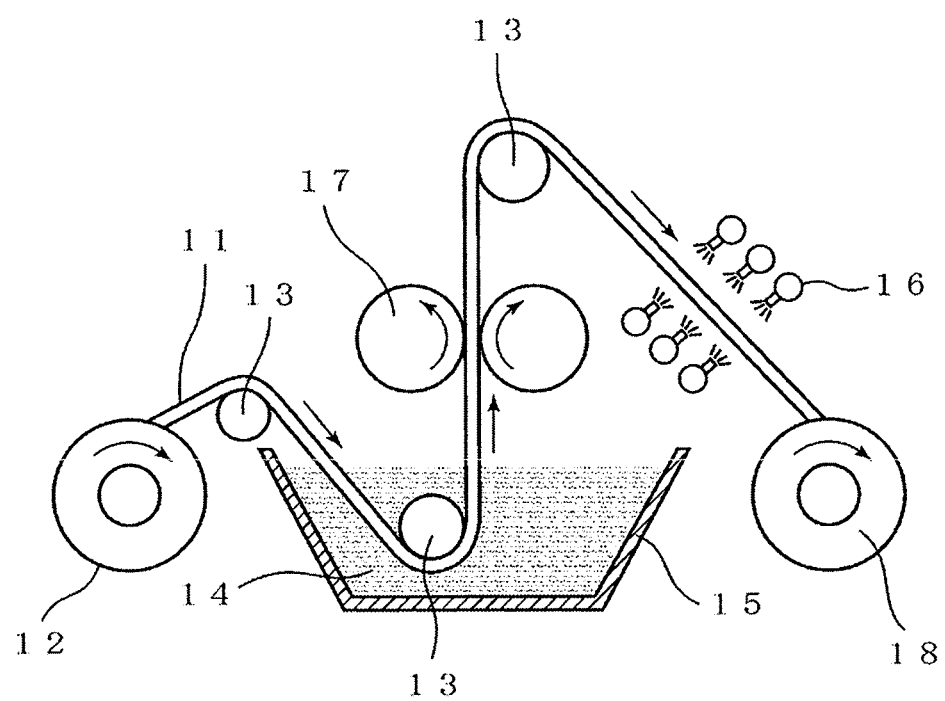
FIG. 8 is a view illustrating an example of a step of a continuous conductive treatment of the surface of a resin molded body with a conductive coating material.

The application of carbon particles to the resin molded body can be performed by dipping the resin molded body to be a subject in the suspension liquid and squeezing and drying the resin molded body. FIG. 8 is a schematic view showing the configuration of a treatment apparatus for conductive treatment of a strip-shaped resin molded body (strip-shaped resin), which is to serve as a skeleton, as an example of a practical manufacturing step. As shown in the figure, this apparatus includes a supply bobbin 12 for feeding a strip-shaped resin 11, a bath 15 containing a suspension liquid 14 of a conductive coating material, a pair of squeezing rolls 17 disposed above the bath 15, a plurality of hot air nozzles 16 disposed on opposite sides of the running strip-shaped resin 11, and a take-up bobbin 18 for taking up the treated strip-shaped resin 11. Further, a deflector roll 13 for guiding the strip-shaped resin 11 is appropriately disposed. In the apparatus thus configured, the strip-shaped resin 11 having a three-dimensional network structure is unwound from the supply bobbin 12, is guided by the deflector roll 13, and is dipped in the suspension liquid in the bath 15. The strip-shaped resin 11 dipped in the suspension liquid 14 in the bath 15 changes its direction upward and runs through between the squeezing rolls 17 disposed above the liquid surface of the suspension liquid 14. In this case, the distance between the squeezing rolls 17 is smaller than the thickness of the strip-shaped resin 11, and therefore the strip-shaped resin 11 is compressed. Thus, an excessive suspension liquid with which the strip-shaped resin 11 is impregnated is squeezed out into the bath 15.

Subsequently, the strip-shaped resin 11 changes its running direction again. The dispersion medium or the like of the suspension liquid is removed by hot air ejected from the hot air nozzles 16 configured by a plurality of nozzles, and the strip-shaped resin 11 fully dried is wound around the take-up bobbin 18. The temperature of the hot air ejected from the hot air nozzles 16 preferably ranges from 40° C. to 80° C. When such an apparatus is used, the conductive treatment can be automatically and continuously performed and a skeleton having a network structure without clogging and having a uniform conductive layer is formed, and therefore, the subsequent metal plating step can be smoothly performed.
(Formation of Aluminum Layer: Molten Salt Plating)

Next, an aluminum-plated layer is formed on the surface of the resin molded body by electroplating in a molten salt. By plating aluminum in the molten salt bath, a thick aluminum layer can be uniformly formed particularly on the surface of a complicated skeleton structure like the resin molded body having a three-dimensional network structure. A direct current is applied between a cathode of the resin molded body having a surface subjected to the conductive treatment and an anode of an aluminum plate with a purity of 99.0% in the molten salt. As the molten salt, an organic molten salt which is an eutectic salt of an organic halide and an aluminum halide or an inorganic molten salt which is an eutectic salt of an alkaline metal halide and an aluminum halide may be used. Use of an organic molten salt bath which melts at a relatively low temperature is preferred because it allows plating without the decomposition of the resin molded body, a base material. As the organic halide, an imidazolium salt, a pyridinium salt or the like may be used, and specifically, 1-ethyl-3-methylimidazolium chloride (EMIC) and butylpyridinium chloride (BPC) are preferred. Since the contamination of the molten salt with water or oxygen causes degradation of the molten salt, plating is preferably performed in an atmosphere of an inert gas, such as nitrogen or argon, and in a sealed environment.

The molten salt bath is preferably a molten salt bath containing nitrogen, and particularly an imidazolium salt bath is preferably used. In the case where a salt which melts at a high temperature is used as the molten salt, the dissolution or decomposition of the resin in the molten salt is faster than the growth of a plated layer, and therefore, a plated layer cannot be formed on the surface of the resin molded body. The imidazolium salt bath can be used without having any affect on the resin even at relatively low temperatures. As the imidazolium salt, a salt which contains an imidazolium cation having alkyl groups at 1,3-position is preferably used, and particularly, aluminum chloride+1-ethyl-3-methylimidazolium chloride ($AlCl_3$+EMIC)-based molten salts are most preferably used because of their high stability and resistance to decomposition. The imidazolium salt bath allows plating of urethane foam resins and melamine foam resins, and the temperature of the molten salt bath ranges from 10° C. to 65° C., and preferably 25° C. to 60° C. With a decrease in temperature, the current density range where plating is possible is narrowed, and plating of the entire surface of a resin molded body becomes difficult. The failure that a shape of a base resin is impaired tends to occur at a high temperature higher than 65° C.

With respect to molten salt aluminum plating on a metal surface, it is reported that an additive, such as xylene, benzene, toluene or 1,10-phenanthroline, is added to $AlCl_3$-EMIC for the purpose of improving the smoothness of the plated surface. The present inventors have found that particularly in aluminum plating of a resin molded body having a three-dimensional network structure, the addition of 1,10-phenanthroline has characteristic effects on the formation of an aluminum porous body. That is, it provides a first characteristic that the smoothness of a plating film is improved and the aluminum skeleton forming the porous body is hardly broken, and a second characteristic that uniform plating can be achieved with a small difference in plating thickness between the surface and the interior of the porous body.

In the case of pressing the completed aluminum porous body or the like, the above-mentioned two characteristics of the hard-to-break skeleton and the uniform plating thickness in the interior and exterior can provide a porous body which has a hard-to-break skeleton as a whole and is uniformly pressed. When the aluminum porous body is used as an electrode material for batteries or the like, it is performed that an electrode is filled with an electrode active material and is pressed to increase its density. However, since the skeleton is often broken in the step of filling the active material or pressing, the two characteristics are extremely effective in such an application.

According to the above description, the addition of an organic solvent to the molten salt bath is preferred, and particularly 1,10-phenanthroline is preferably used. The amount of the organic solvent added to the plating bath preferably ranges from 0.2 to 7 g/L. When the amount is 0.2 g/L or less, the resulting plating is poor in smoothness and brittle, and it is difficult to achieve an effect of decreasing a difference in thickness between the surface layer and the interior. When the amount is 7 g/L or more, plating efficiency is decreased and it is difficult to achieve a predetermined plating thickness.

Figure 9:
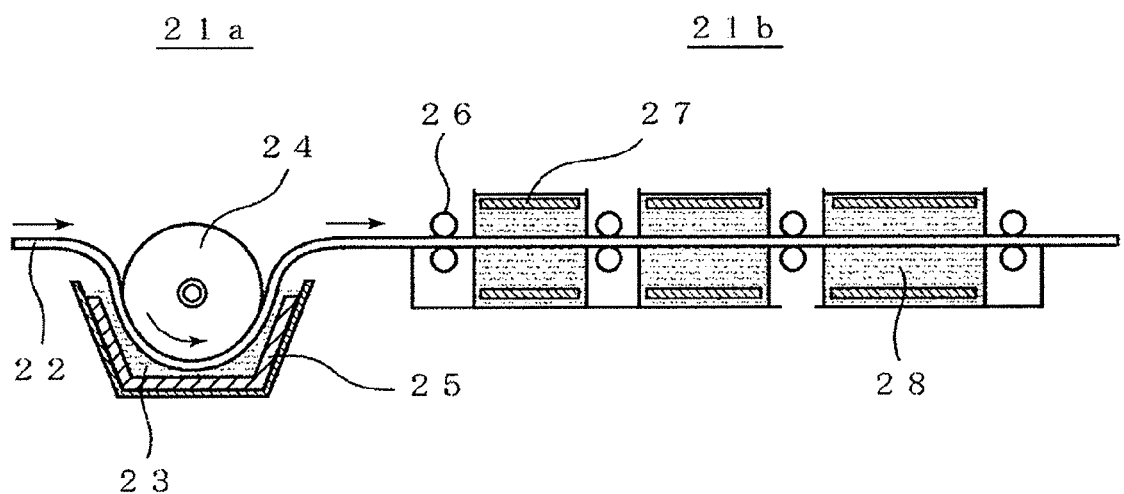
FIG. 9 is a view illustrating an example of a step of continuous aluminum plating utilizing molten salt plating.

FIG. 9 is a view schematically showing the configuration of an apparatus for continuously plating the above-mentioned strip-shaped resin with aluminum. This view shows a configuration in which a strip-shaped resin 22 having a surface subjected to a conductive treatment is transferred from the left to the right in the figure. A first plating bath 21a is configured by a cylindrical electrode 24, an aluminum anode 25 disposed on the inner wall of a container, and a plating bath 23. The strip-shaped resin 22 passes through the plating bath 23 along the cylindrical electrode 24, and thereby a uniform electric current can easily flow through the entire resin molded body, and uniform plating can be achieved. A plating bath 21b is a bath for further performing thick uniform plating and is configured by a plurality of baths so that plating can be performed multiple times. The strip-shaped resin 22 having a surface subjected to a conductive treatment passes through a plating bath 28 while being transferred by electrode rollers 26, which function as feed rollers and power feeding cathodes on the outside of the bath, to thereby perform plating. The plurality of baths include anodes 27 made of aluminum facing both faces of the resin molded body via the plating bath 28, which allow more uniform plating on both faces of the resin molded body. A plating liquid is adequately removed from the plated aluminum porous body by nitrogen gas blowing and then the plated aluminum porous body is washed with water to obtain an aluminum porous body.

On the other hand, an inorganic salt bath can also be used as a molten salt to an extent to which a resin is not melted or the like. The inorganic salt bath is a salt of a two-component system, typically $AlCl_3$—XCl (X: alkali metal), or a multi-component system. Such an inorganic salt bath usually has a higher molten temperature than that in an organic salt bath like an imidazolium salt bath, but it has less environmental constraints such as water content or oxygen and can be put to practical use at a low cost as a whole. When the resin is a melamine foam resin, an inorganic salt bath at 60° C. to 150° C. is employed because the resin can be used at a higher temperature than a urethane foam resin.

An aluminum structure having a resin molded body as the core of its skeleton is obtained through the above-mentioned steps. For some applications such as various filters and a catalyst support, the aluminum structure may be used as a resin-metal composite as it is, but when the aluminum structure is used as a metal porous body without a resin because of constraints resulting from the usage environment, the resin is removed. In the present invention, in order to avoid causing the oxidation of aluminum, the resin is removed through decomposition in a molten salt described below.

(Removal of Resin: Treatment by Molten Salt)

The decomposition in a molten salt is performed in the following manner. A resin molded body having an aluminum plated layer formed on the surface thereof is dipped in a molten salt, and is heated while applying a negative potential (potential lower than a standard electrode potential of aluminum) to the aluminum layer to remove the resin molded body. When the negative potential is applied to the aluminum layer with the resin molded body dipped in the molten salt, the resin molded body can be decomposed without oxidizing aluminum. A heating temperature can be appropriately selected in accordance with the type of the resin molded body. When the resin molded body is urethane, a temperature of the molten salt bath needs to be 380° C. or higher since decomposition of urethane occurs at about 380° C., but the treatment needs to be performed at a temperature equal to or lower than the melting point (660° C.) of aluminum in order to avoid melting aluminum. A preferred temperature range is 500° C. or higher and 600° C. or lower. A negative potential to be applied is on the minus side of the reduction potential of aluminum and on the plus side of the reduction potential of the cation in the molten salt. In this manner, an aluminum porous body which has continuous pores, and has a thin oxide layer on the surface and a low oxygen content can be obtained.

The molten salt used in the decomposition of the resin may be a halide salt of an alkali metal or alkaline earth metal such that the aluminum electrode potential is lower. More specifically, the molten salt preferably contains one or more salts selected from the group consisting of lithium chloride (LiCl), potassium chloride (KCl), and sodium chloride (NaCl). In this manner, a three-dimensional network aluminum porous body which has continuous pores, and has a thin oxide layer on the surface and a low oxygen content can be obtained.

The three-dimensional network aluminum porous body (hereinafter, referred to as an "aluminum porous body") thus obtained can be used for a variety of applications, and its suitable applications will be described below.

Current Collectors for Batteries (Lithium Battery (LIB), Capacitor, Lithium-Ion Capacitor and Molten Salt Battery)

Since the aluminum porous body has a three-dimensional porous structure (high specific surface area), the aluminum porous body has a structure to hold a battery material, and therefore it can form a thick electrode having a large capacity and can decrease an electrode area to reduce the cost. Moreover, the aluminum porous body can decrease the amount of an extra binder or a conduction aid to be used and can increase the capacity of a battery.

The aluminum porous body can be brought into close contact with the battery material to increase a battery output, and can prevent the electrode material from dropping off to extend the lives of a battery, a capacitor and a lithium-ion capacitor, and therefore it can be used for the applications of an electrode current collector of LIB, capacitor, lithium-ion capacitor, molten salt battery and the like.

Carrier for Catalyst (Industrial Deodorizer Catalyst, Sensor Catalyst)

Since the aluminum porous body has a three-dimensional porous structure (high specific surface area), it increases an area for supporting a catalyst or an area of contact with a gas to enhance the effect of a catalyst carrier, and therefore the aluminum porous body can be used for applications of supporting carriers for catalysts such as an industrial deodorizer catalyst and a sensor catalyst.

Heating Instrument (Vaporization/Atomization of Kerosene)

Since the aluminum porous body has a three-dimensional porous structure (high specific surface area), it can heat and vaporize kerosene efficiently in the case of utilizing it as a heater, and therefore the aluminum porous body can be used for applications of heating instruments such as a vaporizer or an atomizer of kerosene.

Various Filters (Oil Mist Separator, Grease Filter)

Since the aluminum porous body has a three-dimensional porous structure (high specific surface area), it increases an area of contact with oil mists or grease and can collect oil or grease efficiently, and therefore the aluminum porous body can be used for applications of various filters such as an oil mist separator and a grease filter.

Filtration Filter for Radiation-Tainted Water

Since aluminum has a property of blocking radiation, it is used as a material for preventing radiation from leaking. At present, it becomes an issue to remove radioactivity from contaminated water generated from an atomic power plant, but since an aluminum foil, which is used as a material for preventing radiation from leaking, does not transmit water, it cannot remove radioactivity from radiation-tainted water. In contrast, since the aluminum porous body has a three-dimensional porous structure (high specific surface area), it can transmit water and can be used as a cleaning filter of radiation-tainted water. Moreover, separation of impurities by filtration can be enhanced by forming a membrane having a double-layered structure of Poreflon (registered trademark: polytetrafluoroethylene (PTFE) porous body) and an aluminum porous body.

Silencer (Sound Deadening of Engine and Air Equipment, Reduction of Wind Roar; Acoustic Absorption of Pantograph)

The aluminum porous body has a large effect of acoustic absorption since it has a three-dimensional porous structure (high specific surface area), and it include aluminum as a material and is lightweight, and therefore the aluminum porous body can be used for applications of silencers of engines and air equipment, and applications of reduction of wind roar such as an acoustic absorption material of a pantograph.

Shielding of Electromagnetic Wave (Shielded Room, Various Shields)

Since the aluminum porous body has a continuous pores structure (high gas permeability), it has higher gas permeability than a sheet-like electromagnetic wave shielding material, and since its pore diameter can be selected freely, it can respond to a variety of frequency bands, and therefore the aluminum porous body can be used for applications of electromagnetic wave shielding such as a shield room and various electromagnetic wave shields.

Heat Dissipation, Heat Exchange (Heat Exchanger, Heat Sink)

Since the aluminum porous body has a three-dimensional porous structure (high specific surface area) and has a high heat conductivity resulting from its material of aluminum, it has a large effect of heat dissipation, and therefore the aluminum porous body can be used for applications of heat dissipation/heat exchange such as a heat exchanger and a heat sink.

Fuel Cell

At present, though carbon paper is mainly used for a gas diffusion-current collector or a separator in a polymer electrolyte fuel cell, the carbon paper has problems that the carbon paper is high in material cost and is also high in manufacturing cost since it requires formation of a complicated flow path. In contrast, since the aluminum porous body has features of a three-dimensional porous structure, low resistance and a passive film on the surface thereof, it can be used as a gas diffusion layer-current collector and a separator in an acidic atmosphere of high potential in a fuel cell without forming the complicated flow path. As a result, the aluminum porous body can realize cost reduction and therefore it can be used for fuel cell applications such as a gas diffusion layer-current collector and a separator in a polymer electrolyte fuel cell.

Support for Hydroponic Culture

In hydroponic culture, a system in which a support is warmed by far infrared rays for accelerating growth is employed. At present, rock wool is mainly used as a support for hydroponic culture, but the heat conductivity of the rock wool is low and therefore the efficiency of heat exchange is low. In contrast, since the aluminum porous body has a three-dimensional porous structure (high specific surface area), it can be used as a support for hydroponic culture, and furthermore, since the aluminum porous body has a high heat conductivity resulting from its material of aluminum and can warm a support efficiently, it can be used as a support for hydroponic culture. Moreover, when the aluminum porous body is used for the support, an induction heating system can be applied to the system of warming a support, and therefore the aluminum porous body can be used as a support for hydroponic culture, which can be warmed more efficiently than that warmed by far infrared rays.

Building Material

Conventionally, an aluminum porous body having closed cells has been sometimes used for building materials aimed at reducing weight. Since the aluminum porous body has a three-dimensional porous structure (high porosity), it can be more lightweight than the aluminum porous body having closed cells. Moreover, since the aluminum porous body has continuous pores, it is possible to fill other materials such as resins into the space of the aluminum porous body, and by combining with a material having a function such as heat insulating properties, sound insulating properties or humidity controlling properties, the aluminum porous body can be processed into a composite material having functions that cannot be realized by conventional aluminum porous bodies having closed cells.

Electromagnetic Induction Heating

It is said that if a flavor is pursued in cookware applications, an earthen pot is preferred. On the other hand, IH heating can perform sensible heat control. An earthen pot capable of IH heating, utilizing both features described above, is required. Conventionally, a method in which a magnetic material is located at the bottom of an earthen pot, or a method of using special clay has been proposed, but any method is insufficient in heat conduction and does not make full use of the feature of IH heating. In contrast, when an earthen pot is formed by using the aluminum porous body as a core material, mixing clay into the core material while kneading, and sintering the resulting mixture in an atmosphere of inert gas, the resulting earthen pot is able to be heated uniformly since the aluminum porous body serving as a core material is exothermic. Both a nickel porous body and an aluminum porous body are effective, but the aluminum porous body is more preferred in consideration of reduction in weight.

A variety of applications of the aluminum porous body have been described. Hereinafter, among the applications described above, particularly, the applications as the current collectors used in a lithium battery, a capacitor, a lithium-ion capacitor and a molten salt battery will be described in detail.

First, a process for manufacturing an electrode from the aluminum porous body thus obtained will be described.

Figure 1:
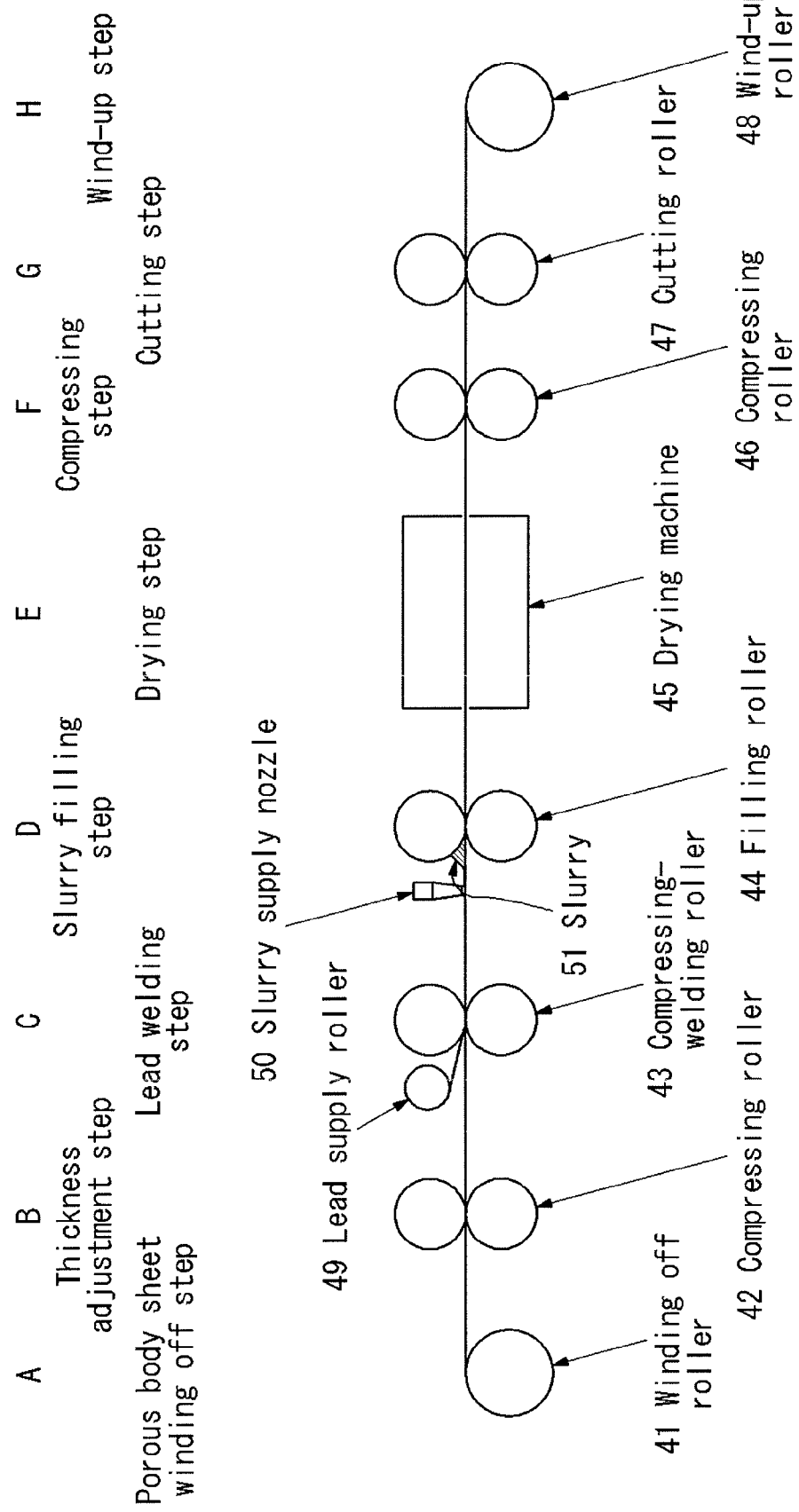
FIG. 1 is a view showing a process for manufacturing an electrode material from an aluminum porous body.

FIG. 1 is a view illustrating an example of a process for continuously manufacturing an electrode from an aluminum porous body. The process includes a porous body sheet winding off step A of winding off a porous body sheet from a winding off roller 41, a thickness adjustment step B using a compressing roller 42, a lead welding step C using a compressing-welding roller 43 and a lead supply roller 49, a slurry filling step D using a filling roller 44, a slurry supply nozzle 50 and a slurry 51, a drying step E using a drying machine 45, a compressing step F using a compressing roller 46, a cutting step G using a cutting roller 47, and a wind-up step H using a wind-up roller 48. Hereinafter, these steps will be described specifically.

(Thickness Adjustment Step)

An aluminum porous body sheet is wound off from a raw sheet roll around which the sheet of an aluminum porous body has been wound and is adjusted so as to have an optimum thickness and a flat surface by roller pressing in the thickness adjustment step. The final thickness of the aluminum porous body is appropriately determined in accordance with an application of an electrode, and this thickness adjustment step is a precompressing step of a compressing step for achieving the final thickness and compresses the aluminum porous body to a level of thickness at which a treatment in the following step is easily performed. A flat-plate press or a roller press is used as a pressing machine. The flat-plate press is preferable for suppressing the elongation of a current collector, but is not suitable for mass production, and therefore roller press capable of continuous treatment is preferably used.

(Lead Welding Step)

The lead welding step includes steps of compressing an end part of the aluminum porous body, and bonding a tab lead to the compressed end part by welding.

Hereinafter, the above-mentioned steps will be described.

—Compression of End Part of Aluminum Porous Body—

When the aluminum porous body is used as an electrode current collector of a secondary battery or the like, a tab lead for external extraction needs to be welded to the aluminum porous body. In the case of an electrode using the aluminum porous body, since a robust metal part is not present in the aluminum porous body, it is impossible to weld a lead piece directly to the aluminum porous body. Therefore, an end part of the aluminum porous body is processed into the form of foil by compressing to impart mechanical strength thereto, and a tab lead is welded to the part.

An example of a method of processing the end part of the aluminum porous body will be described.

Figure 2:
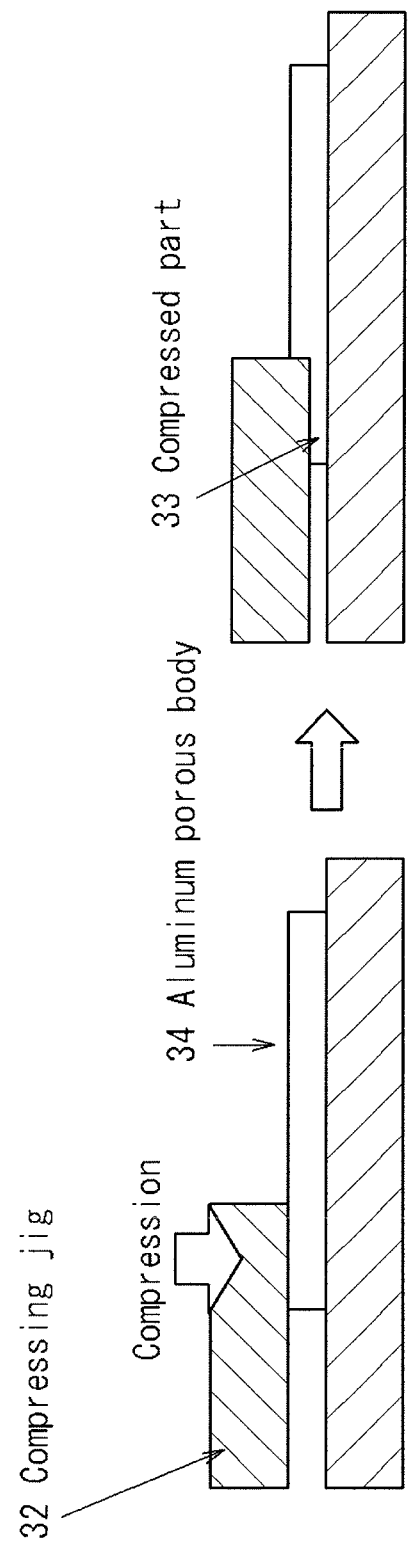
FIG. 2 is a view showing a step of compressing the end part of an aluminum porous body to form a compressed part.

FIG. 2 is a view schematically showing the compressing step.

A rotating roller can be used as a compressing jig.

When the compressed part has a thickness of 0.05 mm or more and 0.2 mm or less (for example, about 0.1 mm), predetermined mechanical strength can be achieved.

Figure 3:
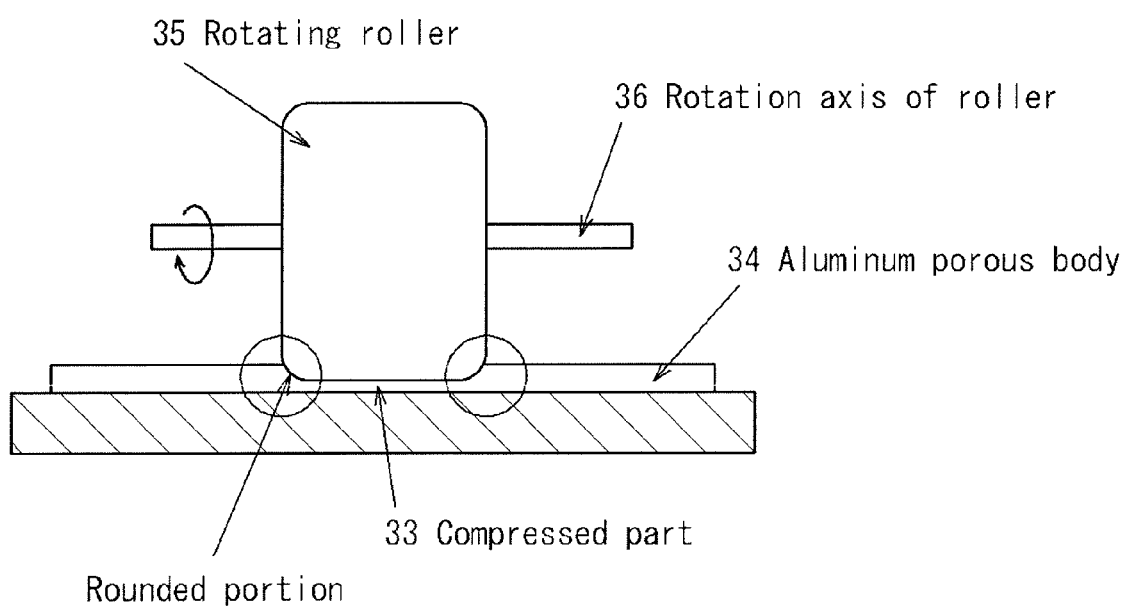
FIG. 3 is a view showing a step of compressing the central part of an aluminum porous body to form a compressed part.

In FIG. 3, the central part of the aluminum porous body 34 having the width of two porous aluminum bodies is compressed by a rotating roller 35 as a compressing jig to form a compressed part (lead part) 33. After compression, the compressed part 33 is cut along the center line of the central part to obtain two sheets of electrode current collectors having a compressed part at the end of the current collector.

Further, a plurality of current collectors can be obtained by forming a plurality of strip-shaped compressed parts at the central part of the aluminum porous body by using a plurality of rotating rollers, and cutting along the respective center lines of these strip-shaped compressed parts.

—Bonding of Tab Lead to Compressed End Part—

A tab lead is bonded to the compressed part of the end part of the current collector thus obtained. It is preferred that a metal foil is used as a tab lead in order to reduce electric resistance of an electrode and the metal foil is bonded to the surface of at least one side of peripheries of the electrode. Further, in order to reduce electric resistance, welding is preferably employed as a bonding method.

Figure 4A:
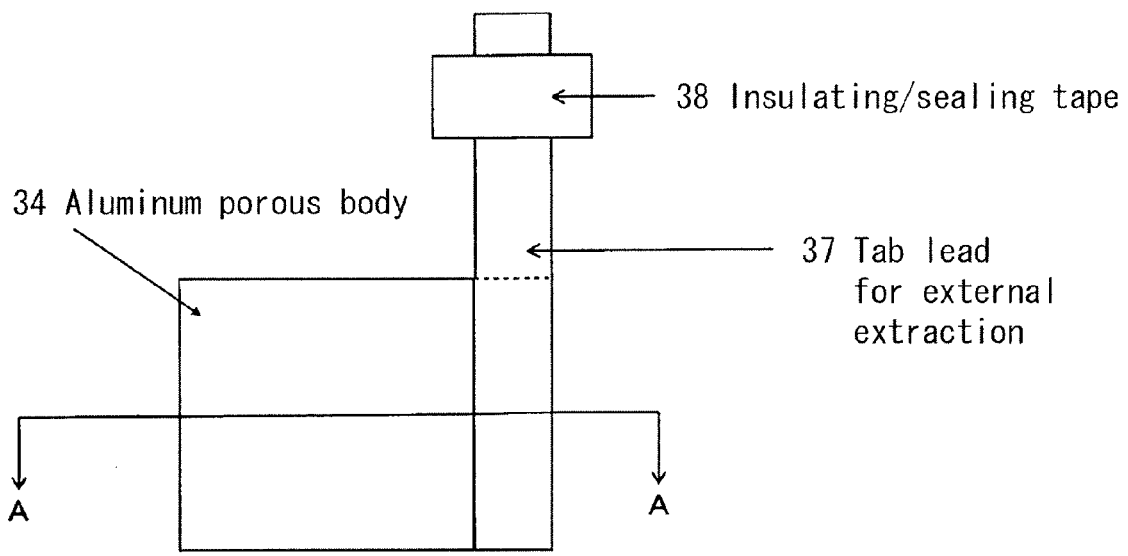
FIGS. 4A and 4B are views showing a state in which a tab lead is bonded to the compressed part in the end part of an aluminum porous body.
Figure 4B:
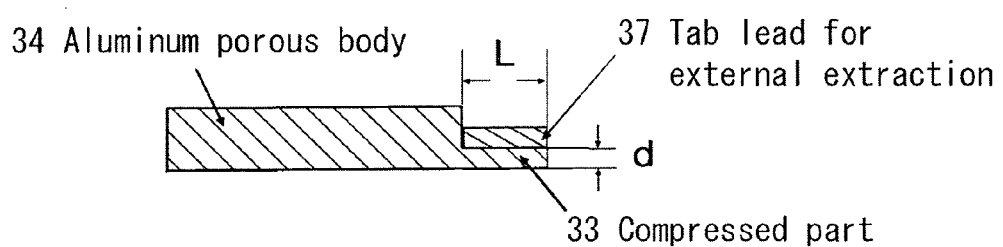

A schematic view of the obtained current collector is shown in FIG. 4A and FIG. 4B. A tab lead 37 is welded to a compressed part 33 of an aluminum porous body 34. FIG. 4B is a sectional view of FIG. 4A, taken on line A-A.

The compressed part for welding a metal foil preferably has a width L of 10 mm or less since a too wide metal foil causes wasted space to increase in a battery and a capacity density of the battery is decreased. When the electrode is too narrow, since welding becomes difficult and the effect of collecting a current is deteriorated, the width is preferably 2 mm or more.

As a method of welding, a method of resistance welding or ultrasonic welding can be used, but the ultrasonic welding is preferred because of its larger bonding area.

—Metal Foil—

A material of the metal foil is preferably aluminum in consideration of electric resistance and tolerance for an electrolytic solution. Further, since impurities in the metal foil causes the elution or reaction of the impurities in a battery, a capacitor or a lithium-ion capacitor, an aluminum foil having a purity of 99.99% or more is preferably used. The thickness of the welded part is preferably smaller than that of the electrode itself.

The aluminum foil is preferably made to have a thickness of 20 to 500 μm.

Though in the above description, the compressing step of the end part and the bonding step of the tab lead have been described as separate steps, the compressing step and the bonding step may be performed simultaneously. In this case, a roller, in which a roller part to be brought into contact, as a compressing roller, with an end part for bonding a tab lead of the aluminum porous body sheet can perform resistance welding, is used, and the aluminum porous body sheet and the metal foil can be simultaneously supplied to the roller to perform compressing of the end part and metal foil welding to the compressed part simultaneously.

(Step of Filling Active Material)

An electrode is obtained by filling the current collector with an active material. A type of the active material is appropriately selected in accordance with the purpose of use of the electrode.

Examples of a method of filling the active material include a method of filling by immersion and a coating method. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material is filled, a conduction aid or a binder is added as required, and an organic solvent is mixed therewith to prepare a slurry, and the prepared slurry is filled into the aluminum porous body by using the above-mentioned filling method.

FIG. 1 shows a method of filling a porous body with a slurry by a roll coating method. As shown in the figure, the slurry is supplied onto a porous body sheet and this sheet is passed between a pair of rotating rollers opposed to each other at a predetermined interval. The slurry is pressed and filled into the aluminum porous body when passing between the rotating rollers.

When the slurry is pressed into the aluminum porous body by using, for example, a filling roller as shown in FIG. 1, compressive stress by the filling roller is applied to the aluminum porous body. In this case, if the aluminum porous body is deformed by the compressive stress, the thickness of the aluminum porous body is decreased, and a volume in which the active material is received is decreased to deteriorate characteristics as a current collector.

Therefore, the aluminum porous body needs to be prevented from deforming even when compressed with a roller. Examples of means therefor include the following means (1) to (3).

(1) The aluminum porous body is made to have a compressive strength of a predetermined value or more.

The aluminum porous body is made to have a compressive strength of 0.2 MPa or more, and the press-in pressure on a slurry in filling the slurry is adjusted to 0.2 MPa or less.

According to the test performed by the present inventors, it has been found that the aluminum porous body can be made to have a compressive strength of 0.2 MPa or more, and the slurry can be filled into the aluminum porous body well by adjusting the press-in pressure on the slurry to about 0.2 MPa. In addition, when the press-in pressure on the slurry exceeds 0.2 MPa, it is not preferred since the deformation of the aluminum porous body occurs.

The compressive strength of the aluminum porous body can be controlled by the thickness of an aluminum skeleton or by alloy composition.

The thickness of an aluminum skeleton is determined by a cell pore diameter, the wall thickness of a urethane foam or an aluminum weight per unit area.

Further, aluminum preferably has higher purity from the viewpoint of the performance as a current collector, but aluminum may be alloyed with other elements by addition in order to increase the strength of the current collector.

As an element with which aluminum is alloyed, at least one element selected from the group consisting of transition metal elements such as Cr, Mn, Fe, Co, Ni, Cu, and Ti can be used. With respect to the aluminum porous body, an aluminum porous body having these elements added thereto is superior in mechanical characteristics such as rigidity and elasticity to a porous body of pure aluminum. Thus, the aluminum porous body having these elements not only can increase the compressive strength but also has excellent holding performance of the active material and can suppress a reduction in discharge capacity and charge-discharge efficiency of a battery.

(2) The surface of an aluminum skeleton is made smooth.

When the surface roughness (Ra) of the aluminum skeleton is large, since the flowability of the slurry is interfered therewith, the surface of the aluminum skeleton is preferably smooth, and specifically the surface roughness (Ra) is preferably adjusted to 10 μm or less.

When the surface roughness is small, since the holding performance of the active material or the like is deteriorated, the value of Ra is preferably 0.5 μm or more.

Generally, the surface roughness (Ra) of a plating film can be controlled by the aluminum salt concentration of a plating bath, an organic additive, a current density, the temperature of a plating bath, the stirring rate of a plating bath and the like.

(3) A cell diameter is control.

The aluminum porous body preferably has an average cell diameter of 50 μm or more and 800 μm or less. When the average cell diameter is less than 50 μm, the aluminum porous body is hardly filled with a slurry. When the average cell diameter is too large, a distance between an aluminum skeleton as a current collector and an active material filled into a pore is large to deteriorate current collecting characteristics, and therefore the average cell diameter is preferably 800 μm or less. The average cell diameter is more preferably 200 μm or more and 500 μm or less.

The average cell diameter of the aluminum porous body is determined by magnifying the surface of the porous body in a photomicrograph or the like, counting the number of cells per 1 inch (25.4 mm), and calculating an average value by the following equation: average pore diameter=25.4 mm/the number of cells.

(Drying Step)

The porous body filled with the active material is transferred to a drying machine and heated to evaporate/remove the organic solvent and thereby an electrode material having the active material fixed in the porous body is obtained.

(Compressing Step)

The dried electrode material is compressed to a final thickness in the compressing step. A flat-plate press or a roller press is used as a pressing machine. The flat-plate press is preferable for suppressing the elongation of a current collector, but is not suitable for mass production, and therefore roller press capable of continuous treatment is preferably used.

FIG. 1 shows a case of compressing by roller pressing.

(Cutting Step)

In order to improve the ability of mass production of the electrode material, it is preferred that the width of a sheet of the aluminum porous body is set to the width of a plurality of final products and the sheet is cut along its traveling direction with a plurality of blades to form a plurality of long sheets of electrode materials. This cutting step is a step of dividing a long length of electrode material into a plurality of long lengths of electrode materials.

(Winding-Up Step)

This step is a step of winding up the plurality of long sheets of electrode materials obtained in the above-mentioned cutting step around a wind-up roller.

Next, applications of the electrode material obtained in the above-mentioned step will be described.

Examples of main applications of the electrode material in which the aluminum porous body is used as a current collector include electrodes for nonaqueous electrolyte batteries such as a lithium battery and a molten salt battery, electrodes for a capacitor, and electrodes for a lithium-ion capacitor.

Hereinafter, these applications will be described.

(Lithium Battery)

Next, an electrode material for batteries using an aluminum porous body and a battery will be described below. For example, when the aluminum porous body is used in a positive electrode of a lithium battery (including a lithium-ion secondary, etc.), lithium cobalt oxide ($LiCoO_2$), lithium manganese oxide ($LiMn_2O_4$), lithium nickel dioxide ($LiNiO_2$) or the like is used as an active material. The active material is used in combination with a conduction aid and a binder.

In a conventional positive electrode material for lithium batteries, an electrode formed by applying an active material to the surface of an aluminum foil is used. Though a lithium battery has a higher capacity than a nickel hydride battery or a capacitor, a further increase in capacity is required in automobile applications. Therefore, in order to increase a battery capacity per unit area, the application thickness of the active material is increased. Further, in order to effectively utilize the active material, the active material needs to be in electrical contact with the aluminum foil, a current collector, and therefore, the active material is mixed with a conduction aid to be used.

In contrast, the aluminum porous body according to the present invention has a high porosity and a large surface area per unit area. Thus, a contact area between the current collector and the active material is increased, and therefore, the active material can be effectively utilized, the battery capacity can be improved, and the amount of the conduction aid to be mixed can be decreased. In a lithium battery, the above-mentioned positive electrode materials are used for a positive electrode, and for a negative electrode, a foil, a punched metal or a porous body of copper or nickel is used as a current collector and a negative electrode active material such as graphite, lithium titanium oxide ($Li_4Ti_5O_{12}$, an alloy of Sn or Si, lithium metal or the like is used. The negative electrode active material is also used in combination with a conduction aid and a binder.

Such a lithium battery can have an increased capacity even with a small electrode area and accordingly have a higher energy density than a conventional lithium battery using an aluminum foil. The effects of the present invention in a secondary battery have been mainly described above, but the effects of the present invention in a primary battery is the same as that in the secondary battery, and a contact area is increased when the aluminum porous body is filled with the active material and a capacity of the primary battery can be improved.

(Configuration of Lithium Battery)

An electrolyte used in a lithium battery includes a non-aqueous electrolytic solution and a solid electrolyte.

Figure 10:
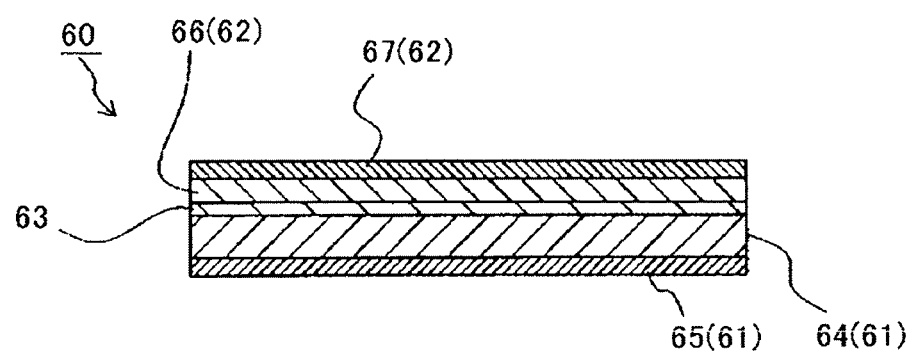
FIG. 10 is a schematic view showing an example of a structure in which an aluminum porous body is applied to a lithium battery.

FIG. 10 is a vertical sectional view of a solid-state lithium battery using a solid electrolyte. A solid-state lithium battery 60 includes a positive electrode 61, a negative electrode 62, and a solid electrolyte layer (SE layer) 63 disposed between both electrodes. The positive electrode 61 includes a positive electrode layer (positive electrode body) 64 and a current collector 65 of positive electrode, and the negative electrode 62 includes a negative electrode layer 66 and a current collector 67 of negative electrode.

As the electrolyte, a nonaqueous electrolytic solution described later is used besides the solid electrolyte. In this case, a separator (porous polymer film, nonwoven fabric or paper) is disposed between both electrodes, and both electrodes and separator are impregnated with the nonaqueous electrolytic solution.

(Active Material Filled into Aluminum Porous Body)

When an aluminum porous body is used in a positive electrode of a lithium battery, a material that can extract/insert lithium can be used as an active material, and an aluminum porous body filled with such a material can provide an electrode suitable for a lithium secondary battery. As the material of the positive electrode active material, for example, lithium cobalt oxide ($LiCoO_2$), lithium nickel dioxide ($LiNiO_2$), lithium cobalt nickel oxide ($LiCo_{0.3}Ni_{0.7}O_2$), lithium manganese oxide ($LiMn_2O_4$), lithium titanium oxide ($Li_4Ti_5O_{12}$), lithium manganese oxide compound ($LiMyMn_{2-y}O_4$); M=Cr, Co, Ni) or lithium acid is used. The active material is used in combination with a conduction aid and a binder. Examples of the material of the positive electrode active material include transition metal oxides such as conventional lithium iron phosphate and olivine compounds which are compounds ($LiFePO_4$, $LiFe_{0.5}Mn_{0.5}PO_4$) of the lithium iron phosphate. Further, the transition metal elements contained in these materials may be partially substituted with another transition metal element.

Moreover, examples of other positive electrode active material include lithium metals in which the skeleton is a sulfide-based chalcogenide such as $TiS_2$, $V_2S_3$, FeS, $FeS_2$ or $LiMS_x$ (M is a transition metal element such as Mo, Ti, Cu, Ni, or Fe, or Sb, Sn or Pb), or a metal oxide such as $TiO_2$, $Cr_3O_8$, $V_2O_5$ or $MnO_2$. Herein, the above-mentioned lithium titanate ($Li_4Ti_5O_{12}$) can also be used as a negative electrode active material.

(Electrolytic Solution Used in Lithium Battery)

A nonaqueous electrolytic solution is used in a polar aprotic organic solvent, and specific examples of the nonaqueous electrolytic solution include ethylene carbonate, diethyl carbonate, dimethyl carbonate, propylene carbonate, γ-butyrolactone and sulfolane. As a supporting salt, lithium tetrafluoroborate, lithium hexafluoroborate, an imide salt or the like is used. The concentration of the supporting salt serving as an electrolyte is preferably higher, but a supporting salt having a concentration of about 1 mol/L is generally used since there is a limit of dissolution.

(Solid Electrolyte Filled into Aluminum Porous Body)

The aluminum porous body may be additionally filled with a solid electrolyte besides the active material. The aluminum porous body can be suitable for an electrode of a solid-state lithium battery by filling the aluminum porous body with the active material and the solid electrolyte. However, the ratio of the active material to materials filled into the aluminum porous body is preferably adjusted to 50 mass % or more and more preferably 70 mass % or more from the viewpoint of ensuring a discharge capacity.

A sulfide-based solid electrolyte having high lithium ion conductivity is preferably used for the solid electrolyte, and examples of the sulfide-based solid electrolyte include sulfide-based solid electrolytes containing lithium, phosphorus and sulfur. The sulfide-based solid electrolyte may further contain an element such as O, Al, B, Si or Ge.

Such an sulfide-based solid electrolyte can be obtained by a publicly known method. Examples of a method of forming the sulfide-based solid electrolyte include a method in which lithium sulfide ($Li_2S$) and diphosphorus pentasulfide ($P_2S_5$) are prepared as starting materials, $Li_2S$ and $P_2S_5$ are mixed in proportions of about 50:50 to about 80:20 in terms of mole ratio, and the resulting mixture is fused and quenched (melting and rapid quenching method) and a method of mechanically milling the quenched product (mechanical milling method).

The sulfide-based solid electrolyte obtained by the above-mentioned method is amorphous. The sulfide-based solid electrolyte can also be utilized in this amorphous state, but it may be subjected to a heat treatment to form a crystalline sulfide-based solid electrolyte. It can be expected to improve lithium ion conductivity by this crystallization.

(Filling of Active Material into Aluminum Porous Body)

For filling the active material (active material and solid electrolyte), publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material (active material and solid electrolyte) is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, ethylene glycol, and N-methyl-2-pyrrolidone. Further, when water is used as a solvent, a surfactant may be used for enhancing filling performance.

In addition, in a conventional positive electrode material for lithium batteries, an electrode is formed by applying an active material onto the surface of an aluminum foil. In order to increase a battery capacity per unit area, the application thickness of the active material is increased. Further, in order to effectively utilize the active material, the active material needs to be in electrical contact with the aluminum foil, and therefore, the active material is mixed with a conduction aid to be used. In contrast, the aluminum porous body according to the present invention has a high porosity and a large surface area per unit area. Thus, a contact area between the current collector and the active material is increased, and therefore, the active material can be effectively utilized, the battery capacity can be improved, and the amount of the conduction aid to be mixed can be decreased.

Figure 11:
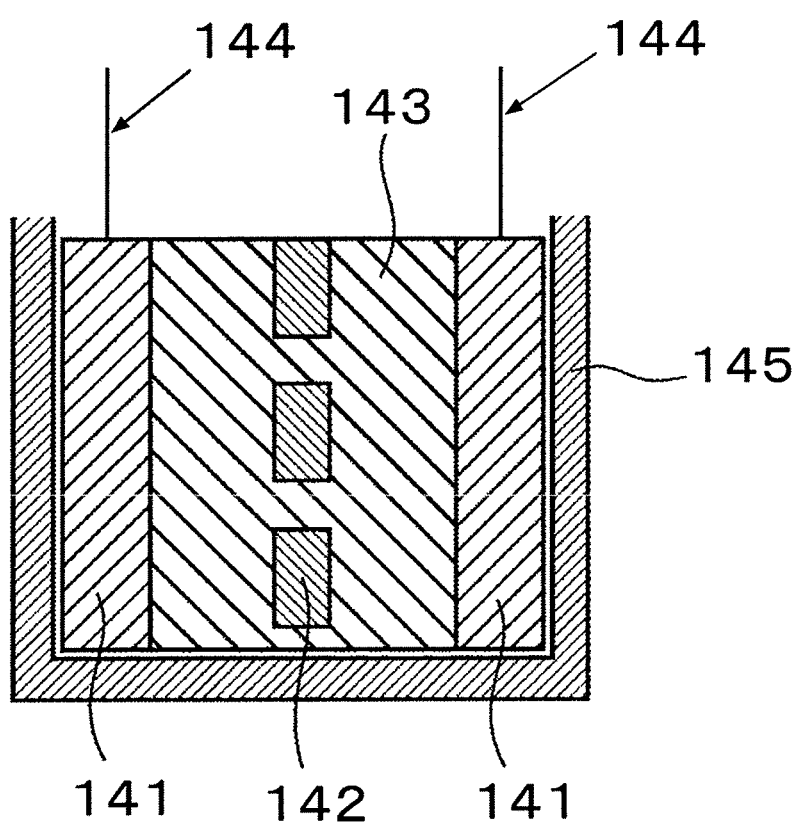
FIG. 11 is a schematic view showing an example of a structure in which an aluminum porous body is applied to a capacitor.

FIG. 11 is a schematic sectional view showing an example of a capacitor manufactured by using an electrode material for a capacitor. An electrode material formed by supporting an electrode active material on an aluminum porous body is disposed as a polarizable electrode 141 in an organic electrolyte 143 partitioned with a separator 142. The polarizable electrode 141 is connected to a lead wire 144, and all these components are housed in a case 145. When the aluminum porous body is used as a current collector, the surface area of the current collector is increased and a contact area between the current collector and activated carbon as an active material is increased, and therefore, a capacitor that can realize a high output and a high capacity can be obtained.

In order to manufacture an electrode for a capacitor, a current collector of the aluminum porous body is filled with the activated carbon as an active material. The activated carbon is used in combination with a conduction aid or a binder.

In order to increase the capacity of the capacitor, the amount of the activated carbon as a main component is preferably in a large amount, and the amount of the activated carbon is preferably 90% or more in terms of the composition ratio after drying (after removing a solvent). The conduction aid and the binder are necessary, but the amounts thereof are preferably as small as possible because they are causes of a reduction in capacity and further the binder is a cause of an increase in internal resistance. Preferably, the amount of the conduction aid is 10 mass % or less and the amount of the binder is 10 mass % or less.

When the surface area of the activated carbon is larger, the capacity of the capacitor is larger, and therefore, the activated carbon preferably has a specific surface area of 1000 $m^2/g$ or more. As a material of the activated carbon, a plant-derived palm shell, a petroleum-based material or the like may be used. In order to increase the surface area of the activated carbon, the material is preferably activated by use of steam or alkali.

The electrode material predominantly composed of the activated carbon is mixed and stirred to obtain an activated carbon paste. This activated carbon paste is filled into the above-mentioned current collector and dried, and its density is increased by compressing with a roller press or the like as required to obtain an electrode for a capacitor.

(Filling of Activated Carbon into Aluminum Porous Body)

For filling of the activated carbon, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, ethylene glycol, and N-methyl-2-pyrrolidone. Further, when water is used as a solvent, a surfactant may be used for enhancing filling performance.

(Preparation of Capacitor)

The electrode obtained in the above-mentioned manner is punched out into an appropriate size to prepare two sheets, and these two electrodes are opposed to each other with a separator interposed therebetween. A porous film or non-woven fabric made of cellulose or a polyolefin resin is preferably used for the separator. Then, the electrodes are housed in a cell case by use of required spacers, and impregnated with an electrolytic solution. Finally, a lid is put on the case with an insulating gasket interposed between the lid and the case and is sealed, and thereby an electric double layer capacitor can be prepared. When a nonaqueous material is used, materials of the electrode and the like are preferably adequately dried for decreasing the water content in the capacitor as much as possible. Preparation of the capacitor is performed in low-moisture environments, and sealing may be performed in reduced-pressure environments. In addition, the capacitor is not particularly limited as long as the current collector and the electrode of the present invention are used, and capacitors may be used which are prepared by a method other than this method.

Though as the electrolytic solution, both an aqueous system and a nonaqueous system can be used, the nonaqueous system is preferably used since its voltage can be set at a higher level than that of the aqueous system. In the aqueous system, potassium hydroxide or the like can be used as an electrolyte. Examples of the nonaqueous system include many ionic liquids in combination of a cation and an anion. As the cation, lower aliphatic quaternary ammonium, lower aliphatic quaternary phosphonium, imidazolium or the like is used, and as the anion, ions of metal chlorides, ions of metal fluorides, and imide compounds such as bis(fluorosulfonyl) imide and the like are known. Further, as the nonaqueous system, there is a polar aprotic organic solvent, and specific examples thereof include ethylene carbonate, diethyl carbonate, dimethyl carbonate, propylene carbonate, γ-butyrolactone and sulfolane. As a supporting salt in the nonaqueous electrolytic solution, lithium tetrafluoroborate, lithium hexafluoroborate or the like is used.

(Lithium-Ion Capacitor)

Figure 12:
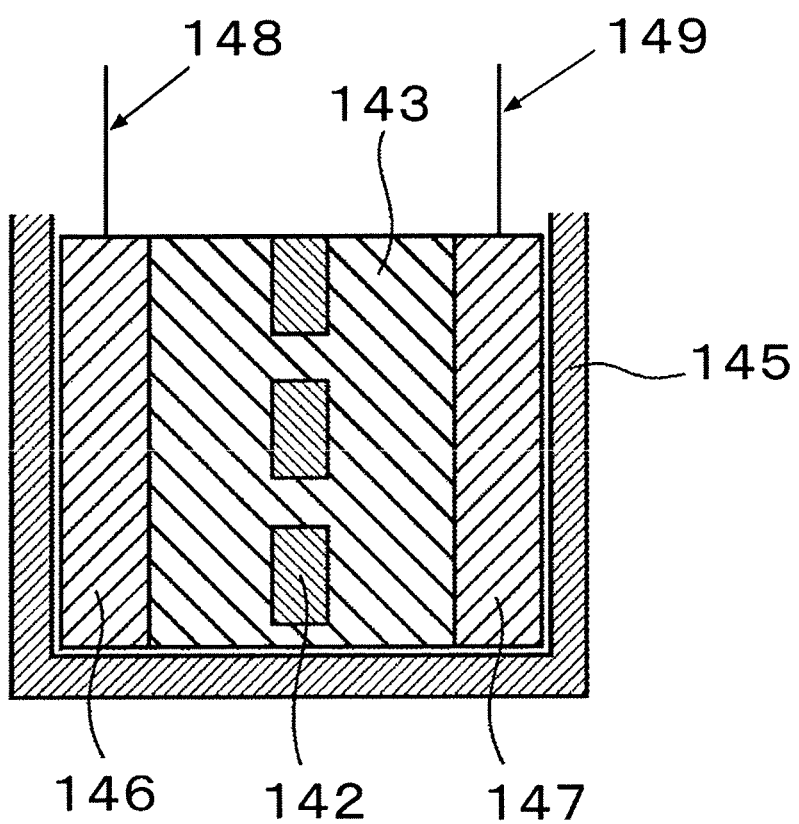
FIG. 12 is a schematic view showing an example of a structure in which an aluminum porous body is applied to a lithium-ion capacitor.

FIG. 12 is a schematic sectional view showing an example of a lithium-ion capacitor manufactured by using an electrode material for a lithium-ion capacitor. In an organic electrolytic solution 143 partitioned with a separator 142, an electrode material formed by supporting a positive electrode active material on an aluminum porous body is disposed as a positive electrode 146 and an electrode material formed by supporting a negative electrode active material on a current collector is disposed as a negative electrode 147. The positive electrode 146 and the negative electrode 147 are connected to a lead wire 148 and a lead wire 149, respectively, and all these components are housed in a case 145. When the aluminum porous body is used as a current collector, the surface area of the current collector is increased, and therefore, even when activated carbon as an active material is applied onto the aluminum porous body in a thin manner, a capacitor that can realize a high output and a high capacity can be obtained.

(Positive Electrode)

In order to manufacture an electrode for a lithium-ion capacitor, a current collector of the aluminum porous body is filled with activated carbon as an active material. The activated carbon is used in combination with a conduction aid or a binder.

In order to increase the capacity of the lithium-ion capacitor, the amount of the activated carbon as a main component is preferably in a large amount, and the amount of the activated carbon is preferably 90% or more in terms of the composition ratio after drying (after removing a solvent). The conduction aid and the binder are necessary, but the amounts thereof are preferably as small as possible because they are causes of a reduction in capacity and further the binder is a cause of an increase in internal resistance. Preferably, the amount of the conduction aid is 10 mass % or less and the amount of the binder is 10 mass % or less.

When the surface area of the activated carbon is larger, the capacity of the lithium-ion capacitor is larger, and therefore, the activated carbon preferably has a specific surface area of 1000 $m^2/g$ or more. As a material of the activated carbon, a plant-derived palm shell, a petroleum-based material or the like may be used. In order to increase the surface area of the activated carbon, the material is preferably activated by use of steam or alkali. As the conduction aid, Ketjen Black, acetylene black, carbon fibers or composite materials thereof may be used. As the binder, polyvinylidene fluoride, polytetrafluoroethylene, polyvinyl alcohol, carboxymethyl cellulose, xanthan gum and the like can be used. A solvent may be appropriately selected from water and an organic solvent depending on the type of the binder. In the organic solvent, N-methyl-2-pyrrolidone is often used. Further, when water is used as a solvent, a surfactant may be used for enhancing filling performance.

The electrode material predominantly composed of the activated carbon is mixed and stirred to obtain an activated carbon paste. This activated carbon paste is filled into the above-mentioned current collector and dried, and its density is increased by compressing with a roller press or the like as required to obtain an electrode for a lithium-ion capacitor.

(Filling of Activated Carbon into Aluminum Porous Body)

For filling of the activated carbon, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, ethylene glycol, and N-methyl-2-pyrrolidone. Further, when water is used as a solvent, a surfactant may be used for enhancing filling performance.

(Negative Electrode)

A negative electrode is not particularly limited and a conventional negative electrode for lithium batteries can be used, but an electrode, in which an active material is filled into a porous body made of copper or nickel like the foamed nickel described above, is preferable because a conventional electrode, in which a copper foil is used for a current collector, has a small capacity. Further, in order to perform the operations as a lithium-ion capacitor, the negative electrode is preferably doped with lithium ions in advance. As a doping method, publicly known methods can be employed. Examples of the doping methods include a method in which a lithium metal foil is affixed to the surface of a negative electrode and this is dipped into an electrolytic solution to dope it, a method in which an electrode having lithium metal fixed thereto is arranged in a lithium-ion capacitor, and after assembling a cell, an electric current is passed between the negative electrode and the lithium metal electrode to electrically dope the electrode, and a method in which an electrochemical cell is assembled from a negative electrode and lithium metal, and a negative electrode electrically doped with lithium is taken out and used.

In any method, it is preferred that the amount of lithium-doping is large in order to adequately decrease the potential of the negative electrode, but the negative electrode is preferably left without being doped by the capacity of the positive electrode because when the residual capacity of the negative electrode is smaller than that of the positive electrode, the capacity of the lithium-ion capacitor becomes small.

(Electrolytic Solution Used in Lithium-Ion Capacitor)

The same nonaqueous electrolytic solution as that used in a lithium battery is used for an electrolytic solution. A nonaqueous electrolytic solution is used in a polar aprotic organic solvent, and specific examples of the nonaqueous electrolytic solution include ethylene carbonate, diethyl carbonate, dimethyl carbonate, propylene carbonate, γ-butyrolactone and sulfolane. As a supporting salt, lithium tetrafluoroborate, lithium hexafluoroborate, an imide salt or the like is used.

(Preparation of Lithium-Ion Capacitor)

The electrode obtained in the above-mentioned manner is punched out into an appropriate size, and is opposed to the negative electrode with a separator interposed between the punched out electrode and the negative electrode. The negative electrode may be an electrode doped with lithium ions by the above-mentioned method, and when the method of doping the negative electrode after assembling a cell is employed, an electrode having lithium metal connected thereto may be arranged in the cell. A porous film or nonwoven fabric made of cellulose or a polyolefin resin is preferably used for the separator. Then, the electrodes are housed in a cell case by use of required spacers, and impregnated with an electrolytic solution. Finally, a lid is put on the case with an insulating gasket interposed between the lid and the case and is sealed, and thereby a lithium-ion capacitor can be prepared. Materials of the electrode and the like are preferably adequately dried for decreasing the water content in the lithium ion capacitor as much as possible. Preparation of the lithium ion capacitor is performed in low-moisture environments, and sealing may be performed in reduced-pressure environments. In addition, the lithium ion capacitor is not particularly limited as long as the current collector and the electrode of the present invention are used, and capacitors may be used which are prepared by a method other than this method.

(Electrode for Molten Salt Battery)

The aluminum porous body can also be used as an electrode material for molten salt batteries. When the aluminum porous body is used as a positive electrode material, a metal compound such as sodium chromite ($NaCrO_2$) or titanium disulfide ($TiS_2$) into which a cation of a molten salt serving as an electrolyte can be intercalated is used as an active material. The active material is used in combination with a conduction aid and a binder. As the conduction aid, acetylene black or the like may be used. As the binder, polytetrafluoroethylene (PTFE) and the like may be used. When sodium chromite is used as the active material and acetylene black is used as the conduction aid, the binder is preferably PTFE because PTFE can tightly bind sodium chromite and acetylene black.

The aluminum porous body can also be used as a negative electrode material for molten salt batteries. When the aluminum porous body is used as a negative electrode material, sodium alone, an alloy of sodium and another metal, carbon, or the like may be used as an active material. Sodium has a melting point of about 98° C. and a metal becomes softer with an increase in temperature. Thus, it is preferable to alloy sodium with another metal (Si, Sn, In, etc.). In particular, an alloy of sodium and Sn is preferred because of its easiness of handleability. Sodium or a sodium alloy can be supported on the surface of the aluminum porous body by electroplating, hot dipping, or another method. Alternatively, a metal (Si, etc.) to be alloyed with sodium may be deposited on the aluminum porous body by plating and then converted into a sodium alloy by charging in a molten salt battery.

Figure 13:
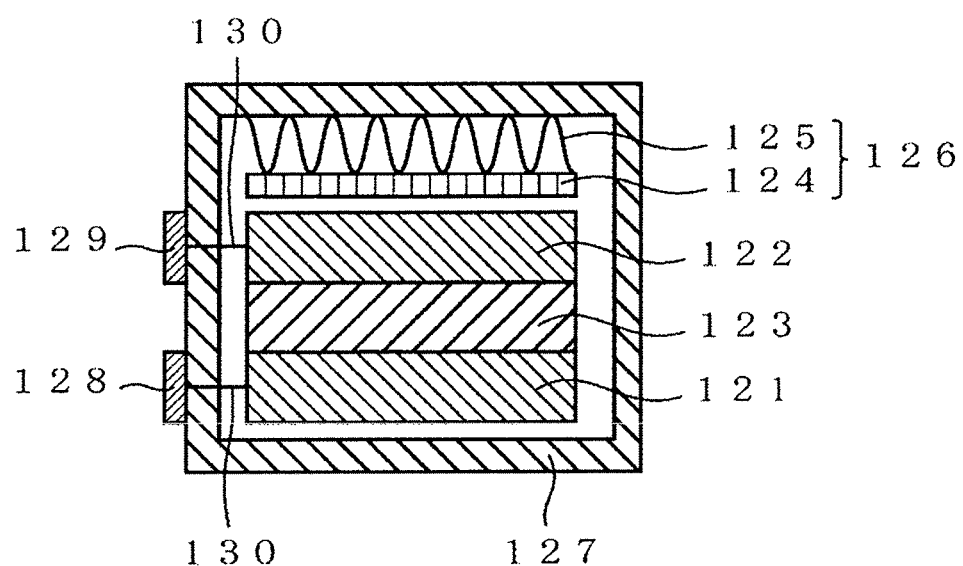
FIG. 13 is a schematic sectional view showing an example of a structure in which an aluminum porous body is applied to a molten salt battery.

FIG. 13 is a schematic sectional view showing an example of a molten salt battery in which the above-mentioned electrode material for batteries is used. The molten salt battery includes a positive electrode 121 in which a positive electrode active material is supported on the surface of an aluminum skeleton of an aluminum porous body, a negative electrode 122 in which a negative electrode active material is supported on the surface of an aluminum skeleton of an aluminum porous body, and a separator 123 impregnated with a molten salt of an electrolyte, which are housed in a case 127. A pressing member 126 including a presser plate 124 and a spring 125 for pressing the presser plate is arranged between the top surface of the case 127 and the negative electrode. By providing the pressing member, the positive electrode 121, the negative electrode 122 and the separator 123 can be evenly pressed to be brought into contact with one another even when their volumes have been changed. A current collector (aluminum porous body) of the positive electrode 121 and a current collector (aluminum porous body) of the negative electrode 122 are connected to a positive electrode terminal 128 and a negative electrode terminal 129, respectively, through a lead wire 130.

The molten salt serving as an electrolyte may be various inorganic salts or organic salts which melt at the operating temperature. As a cation of the molten salt, one or more cations selected from alkali metals such as lithium (Li), sodium (Na), potassium (K), rubidium (Rb) and cesium (Cs), and alkaline earth metals such as beryllium (Be), magnesium (Mg), calcium (Ca), strontium (Sr) and barium (Ba) may be used.

In order to decrease the melting point of the molten salt, it is preferable to use a mixture of at least two salts. For example, use of potassium bis(fluorosulfonyl)amide (K—N($SO_2F)_2$; KFSA) and sodium bis(fluorosulfonyl)amide (Na—N($SO_2F)_2$; NaFSA) in combination can decrease the battery operating temperature to 90° C. or lower.

The molten salt is used in the form of a separator impregnated with the molten salt. The separator prevents the contact between the positive electrode and the negative electrode, and may be a glass nonwoven fabric, a porous resin molded body or the like. A laminate of the positive electrode, the negative electrode, and the separator impregnated with the molten salt housed in a case is used as a battery.

EXAMPLES

Hereinafter, the present invention will be described in more detail based on examples, but the present invention is not limited thereto.

Example 1

(Used Base Material)

A foam having a porosity of 95%, about 46 pores (cells) per inch, a pore diameter of about 552μm, and a thickness of 1 mm was prepared as a resin molded body and was cut into a 100 mm×30 mm square. A film of aluminum was formed on the surface of the polyurethane foam in a weight per unit area of 10 $g/m^2$ by sputtering to form a conductive layer. Hereinafter, the resin molded body subjected to a conductive treatment is referred to as a "sputtered article".

(Composition of Molten Salt Plating Bath)

Plating baths obtained by adding 0.25 g/L of phenanthroline, 1.25 g/L of phenanthroline, 2.5 g/L of phenanthroline or 5.0 g/L of phenanthroline to a plating bath of $AlCl_3$:EMIC=2:1 (mole ratio) were prepared as a molten salt plating bath.

(Pretreatment)

An electrolytic treatment was performed using a base material as an anode prior to plating as an activation treatment (at 2 $A/dm^2$ for 1 minute).

(Plating Condition)

The urethane foam having a conductive layer formed on the surface thereof was loaded as a piece of work in a jig having an electricity supply function, and then the jig was placed in a glove box, the interior of which was adjusted to an argon atmosphere and low moisture (a dew point of −30° C. or lower), and was dipped in the molten salt plating bath at a temperature of 40° C. The jig holding the piece of work was connected to the cathode of a rectifier, and an aluminum plate (purity 99.99%) of the counter electrode was connected to the anode.

Plating was performed under the conditions shown in Table 1 to obtain an aluminum structure in which an aluminum film was formed on the surface of the urethane foam.

Plating conditions are shown Table 1.

TABLE 1

| | Plating condition | | | | |
|---|---|---|---|---|---|
| | Phenanthroline concentration [g/L] | Current density [$A/dm^2$] | Anode | Cathode | Temperature [° C.] |
| Sample 1 | 0.25 | 6 | Aluminum plate | Sputtered article | 60 |
| Sample 2 | 1.25 | 6 | Aluminum plate | Sputtered article | 60 |
| Sample 3 | 2.5 | 6 | Aluminum plate | Sputtered article | 60 |
| Sample 4 | 5.0 | 6 | Aluminum plate | Sputtered article | 60 |

(Removal of Urethane by Decomposition)

Each of the above-mentioned aluminum structures was dipped in a LiCl—KCl eutectic molten salt at a temperature of 500° C., and a negative potential of −1 V was applied to the aluminum structure for 5 minutes. Air bubbles resulting from the decomposition reaction of the polyurethane were generated in the molten salt. Then, the aluminum structure was cooled to room temperature in the atmosphere and was washed with water to remove the molten salt, to obtain an aluminum porous body from which the resin had been removed.

The compressive stress of each obtained sample was evaluated. In the evaluation of the compressive stress, each sample was punched out into a size of 20 mm diameter, changes in thickness were measured while applying a load by a compression tester, and a load required for reducing the thickness of the sample by 5% was employed as compressive stress. The results of measurement are shown in Table 2.

Also, the surface of each sample thus obtained was observed. The measured results of surface roughness are shown in Table 2.

With respect to the surface roughness Ra, 25 μm square area in the aluminum porous body was measured at five points by a laser surface roughness measuring instrument, and an arithmetic average of five roughnesses Ra was employed as surface roughness.

(Filling of Slurry into Aluminum Porous Body)

$LiCoO_2$ powders (positive electrode active material) having an average particle diameter of 5 μM was prepared as an active material, and the $LiCoO_2$ powder, acetylene black (conduction aid) and PVDF (binder) were mixed in proportions of 90:5:5 in terms of mass%. N-Methyl-2-pyrrolidone (organic solvent) was added dropwise to the mixture, and the resulting mixture was mixed to prepare a paste-like slurry of a positive electrode mixture. Then, the slurry of a positive electrode mixture was supplied to the surface of each of the aluminum porous body samples 1 to 4 and was pressed under a load of 0.2 MPa by a roller, and thereby the aluminum porous body samples 1 to 4 were filled with the positive electrode mixture. Thereafter, the slurry was dried at 100° C. for 40 minutes to remove the organic solvent to obtain positive electrode samples 1 to 4.

Cross-sections of the obtained positive electrode samples were observed, and consequently shapes of all samples did not change compared with the shapes observed before filling.

Further, the abundances of the active sample per unit area of the electrodes were determined based on changes in weights of the positive electrode samples before and after filling.

The abundance of the active material of the sample 4 is taken as 100, and a ratio (filling ratio) of the abundance of the active material of each sample to the above-mentioned abundance is shown in Table 2.

It is found from these results that when the surface of the aluminum skeleton is smooth, filling efficiency of the slurry is improved.

Further, the abundances of the active sample per unit area of the electrodes were determined based on changes in weights of the positive electrode samples before and after filling.

The abundance of the active material of the sample 4 is taken as 100, and a ratio (filling ratio) of the abundance of the active material of each sample to the above-mentioned abundance is shown in Table 2.

It is found from these results that when the surface of the aluminum skeleton is smooth, filling efficiency of the slurry is improved.

TABLE 2

|  | Compressive stress (MPa) | Surface roughness (Ra) (μm) | Ratio of filled active material (sample 4 is taken as 100) |
|---|---|---|---|
| Sample 1 | 0.5 | 40 | 89 |
| Sample 2 | 0.8 | 9.5 | 95 |
| Sample 3 | 1.1 | 1.3 | 98 |
| Sample 4 | 1.3 | 0.6 | 100 |

Example 2

(Used Base Material)

As resin molded bodies, a urethane foam having 30 pores (cells) per inch (pore diameter of 847 μm), a urethane foam having 40 pores (cells) per inch (pore diameter of 635 μm, a urethane foam having 50 pores (cells) per inch (pore diameter of 508 μm) and a urethane foam having 60 pores (cells) per inch (pore diameter of 423 μm), each having a porosity of 95% and a thickness of 1 mm were prepared and were cut into a 100 mm×30 mm square. A film of aluminum was formed on the surface of the polyurethane foam in a weight per unit area of 10 g/m² by sputtering to form a conductive layer.

(Composition of Molten Salt Plating Bath)

A plating bath of $AlCl_3$:EMIC=2:1 (mole ratio) was prepared as a molten salt plating bath.

In the same conditions as those of the sample 4 in Example 1, an aluminum film was formed on the surface of the urethane foam, and then the urethane was removed to obtain porous aluminum bodies (samples 5 to 8).

The samples 5 to 8 were filled with a slurry in the same manner as in Example 1, and the abundances of the active material per unit area of the electrodes were investigated based on changes in weights of the resulting samples 5 to 8 before and after filling. The results are shown in Table 3.

TABLE 3

|  | Compressive stress (MPa) | Surface roughness (Ra) (μm) | Ratio of filled active material (sample 4 is taken as 100) |
|---|---|---|---|
| Sample 5 | 1.6 | 0.6 | 123 |
| Sample 6 | 1.4 | 0.6 | 110 |
| Sample 7 | 1.3 | 0.6 | 105 |
| Sample 8 | 1.3 | 0.6 | 98 |

It is found from the above-mentioned results that the aluminum porous body having a larger cell diameter has higher filling efficiency of the active material.

An electrolytic solution type lithium secondary battery was prepared by using each of the positive electrode samples 5 to 8 described above.

The electrolytic solution type lithium secondary battery was prepared in the following manner.

A positive electrode obtained by punching out the positive electrode sample into a size of 14 mm diameter was used. A lithium-aluminum (Li—Al) alloy foil (diameter: 15 mm, thickness: 500 μm) was used as a negative electrode, and the positive electrode (positive electrode sample) and the negative electrode were laminated with a separator made of polypropylene interposed therebetween. This laminate was housed in a coin type battery case having a positive electrode case and a negative electrode case, respectively made of stainless steel, and then an organic electrolytic solution was poured in the battery case. A mixture obtained by dissolving $LiClO_4$ in an amount of 1 mol % in a mixed organic solvent of propylene carbonate and 1,2-dimethoxyethane (volume ratio of 1:1) was used as the organic electrolytic solution. After pouring the organic electrolytic solution, a gasket made of a resin was inserted between the positive electrode case and the negative electrode case, and the positive electrode case and the negative electrode case were caulked with each other to seal the inside to prepare a coin-shaped electrolytic solution type lithium secondary battery. Such a battery for evaluation was prepared using each positive electrode sample. In addition, in any case where the positive electrode samples were used, a leaf spring was not inserted between the positive electrode sample and the positive electrode case. The electrolytic solution type lithium secondary batteries using the positive electrode samples were evaluated in the following manner.

A charge-discharge cycle, in which a charge current and a discharge current were respectively 10 μA and a voltage ranges from 3.3 V to 2.0 V, was performed and a discharge capacity was measured to evaluate each positive electrode sample. After the battery was charged at a charge current of 10 μA, the discharge capacity was measured at a discharge current of 20 μA, and at a discharge current of 50 μA, and a ratio thereof to the discharge capacity measured at discharge current of 10 μA was determined. The results are shown in Table 4.

TABLE 4

| | Discharge capacity at discharge current of 20 μA | Discharge capacity at discharge current of 50 μA |
|---|---|---|
| Sample 5 | 95 | 78 |
| Sample 6 | 99 | 92 |
| Sample 7 | 101 | 96 |
| Sample 8 | 100 | 100 |

It is found from the above-mentioned results that the aluminum porous body having a smaller average cell diameter has more excellent characteristics as a battery.

The present invention has been described based on embodiments, but it is not limited to the above-mentioned embodiments. Variations to these embodiments may be made within the scope of identity and equivalence of the present invention.

Industrial Applicability

The electrode manufactured by using the aluminum porous body for a current collector of the present invention increases the active material availability ratio per a unit volume and can realize a higher capacity, and can decrease the number of layers of a laminate to reduce processing cost in processing the aluminum porous body into an electrode, and therefore it can be suitably used as an electrode for nonaqueous electrolyte batteries (lithium battery, etc.), a capacitor and a lithium-ion capacitor.

REFERENCE SIGNS LIST

| 1 | Resin molded body |
|---|---|
| 2 | Conductive layer |
| 3 | Aluminum-plated layer |
| 21a, 21b | Plating bath |
| 22 | Strip-shaped resin |
| 23, 28 | Plating bath |
| 24 | Cylindrical electrode |
| 25, 27 | Anode |
| 26 | Electrode roller |
| 32 | Compressing jig |
| 33 | Compressed part |
| 34 | Aluminum porous body |
| 35 | Rotating roller |
| 36 | Rotation axis of roller |
| 37 | Tab lead |
| 38 | Insulating/sealing tape |
| 41 | Winding off roller |
| 42 | Compressing roller |
| 43 | Compressing-welding roller |
| 44 | Filling roller |
| 45 | Drying machine |
| 46 | Compressing roller |
| 47 | Cutting roller |
| 48 | Wind-up roller |
| 49 | Lead supply roller |
| 50 | Slurry supply nozzle |
| 51 | Slurry |
| 60 | Lithium battery |
| 61 | Positive electrode |
| 62 | Negative electrode |
| 63 | Solid electrolyte layer (SE layer) |
| 64 | Positive electrode layer (positive electrode body) |
| 65 | Current collector of positive electrode |
| 66 | Negative electrode layer |
| 67 | Current collector of negative electrode |
| 121 | Positive electrode |
| 122 | Negative electrode |
| 123 | Separator |
| 124 | Presser plate |
| 125 | Spring |
| 126 | Pressing member |
| 127 | Case |
| 128 | Positive electrode terminal |
| 129 | Negative electrode terminal |
| 130 | Lead wire |
| 141 | Polarizable electrode |
| 142 | Separator |
| 143 | Organic electrolytic solution |
| 144 | Lead wire |
| 145 | Case |
| 146 | Positive electrode |
| 147 | Negative electrode |
| 148 | Lead wire |
| 149 | Lead wire |

The invention claimed is:

1. An electrode comprising:
   a sheet-shaped three-dimensional network aluminum porous body for a current collector, and
   active material filled in the aluminum porous body,
   wherein the aluminum porous body has a compressive strength in a thickness direction of 0.2 MPa or more whereas press-in pressure for filling the aluminum porous body with slurry including the active material is adjusted to 0.2 MPa or less, and
   wherein a skeleton of the aluminum porous body has surface roughness (Ra) of 0.5 μm or more to thereby secure holding performance of the active material and 10 μm or less to thereby secure flowability of the slurry.

2. The electrode according to claim 1, wherein the aluminum porous body has an average cell diameter of 50 μm or more and 800 μm or less.

3. The electrode according to claim 2, wherein the average cell diameter is 200 μm or more and 500 μm or less.

4. A nonaqueous electrolyte battery, comprising using the electrode according to claim 1.

5. A nonaqueous electrolyte battery, comprising using the electrode according to claim 2.

6. A nonaqueous electrolyte battery, comprising using the electrode according to claim 3.

7. A capacitor using a nonaqueous electrolytic solution, comprising using the electrode according to claim 1.

8. A capacitor using a nonaqueous electrolytic solution, comprising using the electrode according to claim 2.

9. A capacitor using a nonaqueous electrolytic solution, comprising using the electrode according to claim 3.

10. A lithium ion-capacitor using a nonaqueous electrolytic solution, comprising using the electrode according to claim 1.

11. A lithium ion-capacitor using a nonaqueous electrolytic solution, comprising using the electrode according to claim 2.

12. A lithium ion-capacitor using a nonaqueous electrolytic solution, comprising using the electrode according to claim 3.

* * * * *